(12) United States Patent
Genda et al.

(10) Patent No.: US 8,442,336 B2
(45) Date of Patent: May 14, 2013

(54) IMAGE PROCESSING APPARATUS, COMPRESSION METHOD, AND EXTENSION METHOD

(75) Inventors: Daisuke Genda, Saitama (JP); Hideki Morita, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 887 days.

(21) Appl. No.: 12/567,877

(22) Filed: Sep. 28, 2009

(65) Prior Publication Data

US 2010/0080474 A1 Apr. 1, 2010

(30) Foreign Application Priority Data

Oct. 1, 2008 (JP) .................................. 2008-256259

(51) Int. Cl.
*G06K 9/36* (2006.01)
*G06K 9/46* (2006.01)

(52) U.S. Cl.
USPC ............................. 382/239; 382/233; 382/251

(58) Field of Classification Search .................. 382/176, 382/180, 232, 233, 237, 239, 251, 272
See application file for complete search history.

(56) References Cited

U.S. PATENT DOCUMENTS

| | | | | |
|---|---|---|---|---|
| 5,585,944 A | * | 12/1996 | Rodriguez | 358/500 |
| 5,742,704 A | * | 4/1998 | Suzuki et al. | 382/176 |
| 6,134,348 A | * | 10/2000 | Nakaya et al. | 382/224 |
| 6,385,337 B1 | * | 5/2002 | Klassen | 382/166 |
| 6,603,884 B2 | * | 8/2003 | Matsuura et al. | 382/248 |

FOREIGN PATENT DOCUMENTS

| | | |
|---|---|---|
| JP | 8-9167 A | 1/1996 |
| JP | 2000-50268 A | 2/2000 |
| JP | 2002-190956 A | 7/2002 |
| JP | 2002-209110 A | 7/2002 |

OTHER PUBLICATIONS

Notification of Reason of Refusal for Patent Application No. 2008-256259, mailed Apr. 3, 2012, with English translation.

* cited by examiner

*Primary Examiner* — Phuoc Tran
(74) *Attorney, Agent, or Firm* — Cantor Colburn LLP

(57) ABSTRACT

Disclosed is an image processing apparatus comprising an image compression conversion unit to quantize an image having attribute data for each pixel, wherein when a region has the attribute data of a photographic image, the image compression conversion unit quantizes the region by a BTC method, wherein when a region has the attribute data of other than the photographic image, and the region is a halftone region, the image compression conversion unit quantizes the region by the BTC method, and wherein when a region has the attribute data of other than the photographic image, and the region is a high resolution region, the image compression conversion unit generates a density pattern for the region to quantize the region according to the generated density pattern.

14 Claims, 32 Drawing Sheets

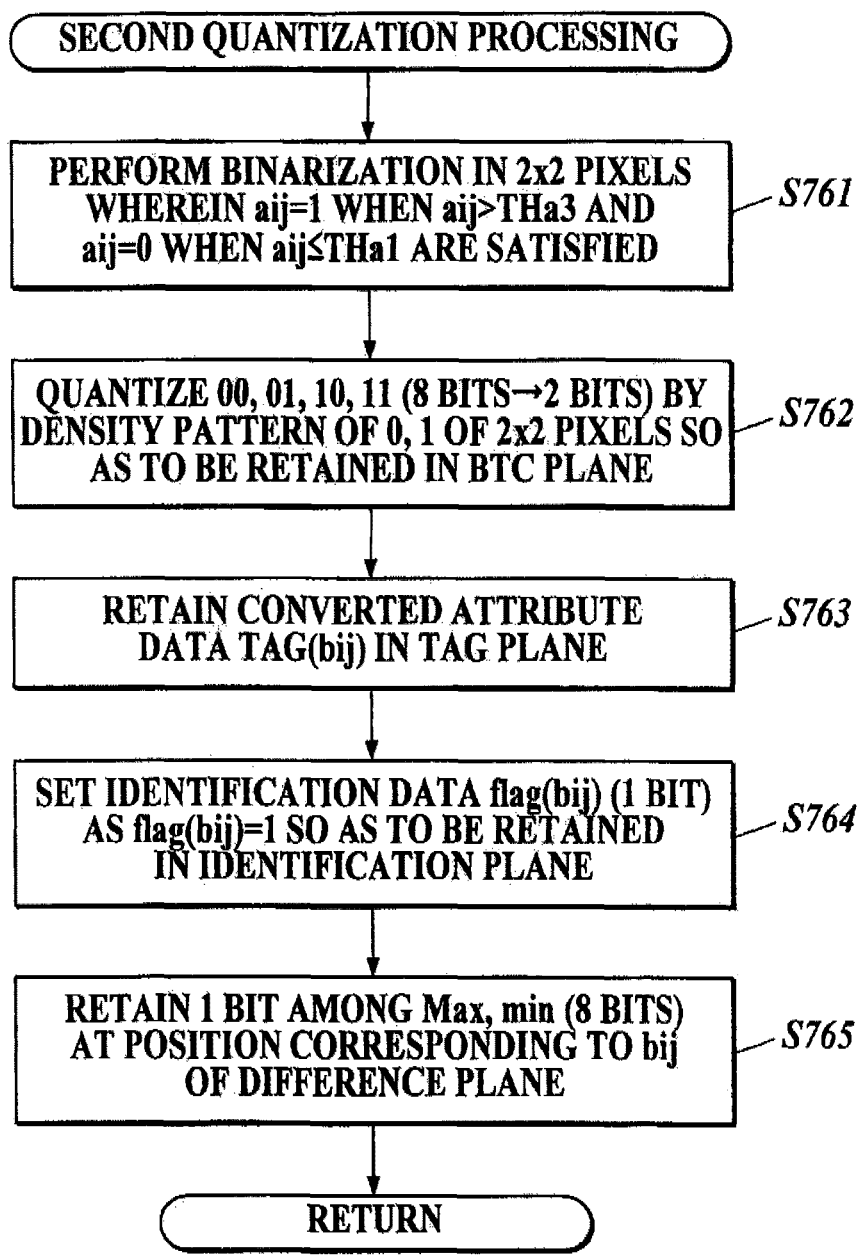

FIG.14

■ DENSITY PATTERN H0
PIXEL WHICH SATISFIES NOT LESS THAN THa3 IS 1

| 1 | 0 |
|---|---|
| 0 | 0 | or

| 0 | 1 |
|---|---|
| 0 | 0 | or

| 0 | 0 |
|---|---|
| 1 | 0 | or

| 0 | 0 |
|---|---|
| 0 | 1 |

→ BTC(b00)=00 a00 a01
a10 a11

■ DENSITY PATTERN H1
PIXELS WHICH SATISFIES NOT LESS THAN THa3 ARE 2, AND THE FOLLOWING PATTERN

| 1 | 1 |
|---|---|
| 0 | 0 | or

| 1 | 0 |
|---|---|
| 1 | 0 | or

| 0 | 1 |
|---|---|
| 1 | 0 |

→ BTC(b00)=01 a00 a01
a10 a11

■ DENSITY PATTERN H2
PIXELS WHICH SATISFIES NOT LESS THAN THa3 ARE 2, AND THE FOLLOWING PATTERN

| 0 | 1 |
|---|---|
| 0 | 1 | or

| 0 | 0 |
|---|---|
| 1 | 1 | or

| 1 | 0 |
|---|---|
| 0 | 1 |

→ BTC(b00)=10 a00 a01
a10 a11

■ DENSITY PATTERN H3
PIXELS WHICH SATISFIES NOT LESS THAN THa3 ARE 3

| 0 | 1 |
|---|---|
| 1 | 1 | or

| 1 | 0 |
|---|---|
| 1 | 1 | or

| 1 | 1 |
|---|---|
| 0 | 1 | or

| 1 | 1 |
|---|---|
| 1 | 0 |

→ BTC(b00)=11 a00 a01
a10 a11

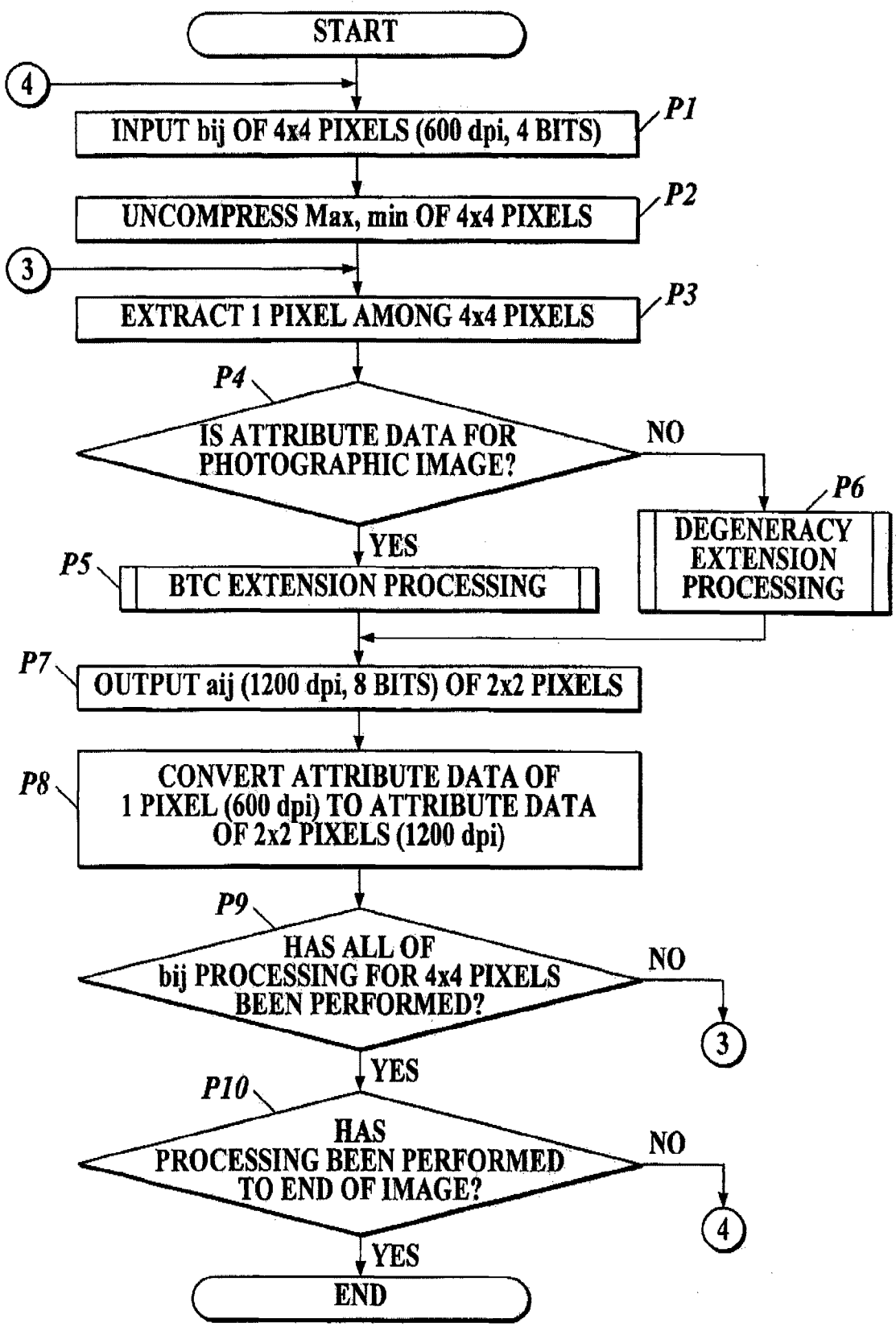

PROCESSING IMAGE (600dpi, 4bit)

UNCOMPRESSED IMAGE (1200dpi, 8bit)

FIG21

■ BTC(b00) = 00 → DENSITY PATTERN H0

| bij | → | 1 0 / 0 0 | or | 0 0 / 0 1 | AVERAGED PATTERN: 1/4 1/4 / 1/4 1/4 | WHEN DECODED 1 → Max (ALL 1/4 Max WHEN AVERAGED PATTERN) 0 → min |

■ BTC(b00) = 01 → DENSITY PATTERN H1

| bij | → | 1 1 / 0 0 | or | 0 1 / 1 0 | AVERAGED PATTERN: 1/2 1/2 / 1/2 1/2 | WHEN DECODED 1 → Max (ALL 1/2 Max WHEN AVERAGED PATTERN) 0 → min |

■ BTC(b00) = 10 → DENSITY PATTERN H2

| bij | → | 0 1 / 1 1 | or | 1 0 / 0 1 | AVERAGED PATTERN: 1/2 1/2 / 1/2 1/2 | WHEN DECODED 1 → Max (ALL 1/2 Max WHEN AVERAGED PATTERN) 0 → min |

■ BTC(b00) = 11 → DENSITY PATTERN H3

| bij | → | 0 1 / 1 1 | or | 1 1 / 1 0 | AVERAGED PATTERN: 3/4 3/4 / 3/4 3/4 | WHEN DECODED 1 → Max (ALL 3/4 Max WHEN AVERAGED PATTERN) 0 → min |

FIG.23

WHEN BTC(bij)=00

| | X1 | | X2 | X3 | PREDICTED DENSITY PATTERN H0 |
|---|---|---|---|---|---|
| 1 — C bij / C C  2 — C bij / bij C  3 — bij C / C C  4 — C bij / C C (variants) | 5 — C / M bij  7 — C / bij M  9 — bij M / C  11 — C bij / M | 6 — M / C bij  8 — M / bij C  10 — bij C / M  12 — M bij / C | 17 — C C / C bij  18 — C C / bij C  19 — bij C / C C  20 — C bij / C C | 13 — M / M bij  14 — M / bij M  15 — bij M / M  16 — M bij / M | 1 0 / 0 0 |
| | | | 21 — M M / M bij  22 — M M / bij M  23 — bij M / M M  24 — M bij / M M | | 0 1 / 0 0 |
| | | | | | 0 0 / 1 0 |
| | | | | | 0 0 / 0 1 |

MATCHING CONDITION
C: HALFTONE CONDITION AND DENSITY DIFFERENCE OF $|C_{den} - bij_{Max}| < TC$
M: HIGH RESOLUTION CONDITION AND DENSITY DIFFERENCE OF $|M_{Max} - bij_{Max}| < TM$

WHEN BTC(bij)=01

| | X1 | | X2 | PREDICTED DENSITY PATTERN H1 |
|---|---|---|---|---|
| 1 | 2 | 5 | 19 | 0 1 / 1 0 |
| Q Q M / Q bij Q / M Q Q | Q Q Q / Q bij M / M Q Q | Q Q M / Q bij Q / Q M Q | C C C / C bij C / C C C | |
| 8 | 9 | 10 | 22 | |
| bij / M1 / M1 | M1 / bij / M1 | M1 / bij / M1 | M M M / M bij M / M M M | |

MATCHING CONDITION
C: HALFTONE CONDITION AND DENSITY DIFFERENCE OF $|C_{den}-bij_{Max}| < TC$
M: HIGH RESOLUTION CONDITION AND DENSITY DIFFERENCE OF $|M_{Max}-bij_{Max}| < TM$
M1: CONDITION OF M AND DENSITY PATTERN H1
M2: CONDITION OF M AND DENSITY PATTERN H2
Q: SATISFIES NEITHER OF C, M, M1, M2

FIG.26

WHEN BTC(bij)=10

| | X1 | | X2 | PREDICTED DENSITY PATTERN H2 |
|---|---|---|---|---|
| 4 | 5 | 12 | 19 | |
| Q Q M / Q bij Q / - M Q | Q M Q / Q bij Q / Q Q M | M2 / bij / M2 | C C / C bij C / C C | 0 1 / 0 1 |
| 15 | 16 | 18 | 22 | |
| M2 / M2 / bij | bij / M2 / M2 | Q / bij M1 / Q | M M / M bij M / M M | |

MATCHING CONDITION
C: HALFTONE CONDITION AND DENSITY DIFFERENCE OF |Cden-bijMax|<TC
M: HIGH RESOLUTION CONDITION AND DENSITY DIFFERENCE OF |MMax-bijMax|<TM
M1: CONDITION OF M AND DENSITY PATTERN H1H1
M2: CONDITION OF M AND DENSITY PATTERN H2
Q: SATISFIES NEITHER OF C, M, M1, M2

FIG 27

WHEN BTC(bij)=10

FIG. 28

WHEN BTC(bij)=11

| | X1 | | X2 | X3 | PREDICTED DENSITY PATTERN H3 |
|---|---|---|---|---|---|
| 1: C,bij / C,C | 5: C,bij / M,bij | 9: bij,M / M,C | 13: M,bij / M,bij | 17: C,C,bij / C,C,C | 21: M,M / M,bij — 1,1/1,0 |
| 2: C,C / bij,C | 6: M,bij / C,bij | 10: bij,M / C,M | 14: M,bij / bij,C | 18: C,C,C / bij,C,C | 22: M,M,M / bij,M,M — 1,1/0,1 |
| 3: bij,C / C,C | 7: C,bij / bij,M | 11: C,bij / M,M | 15: bij,M / M,bij | 19: bij,C,C / C,C,C | 23: bij,M,M / M,M,M — 0,1/1,1 |
| 4: C,bij / M,C | 8: bij,M / C,C | 12: M,bij / C,M | 16: M,bij / M,M | 20: C,bij,C / C,C,C | 24: M,bij,M / M,M,M — 1,0/1,1 |

MATCHING CONDITION
  C: HALFTONE CONDITION AND DENSITY DIFFERENCE OF $|C_{den} - bij_{Max}| < TC$
  M: HIGH RESOLUTION CONDITION AND DENSITY DIFFERENCE OF $|M_{Max} - bij_{Max}| < TM$

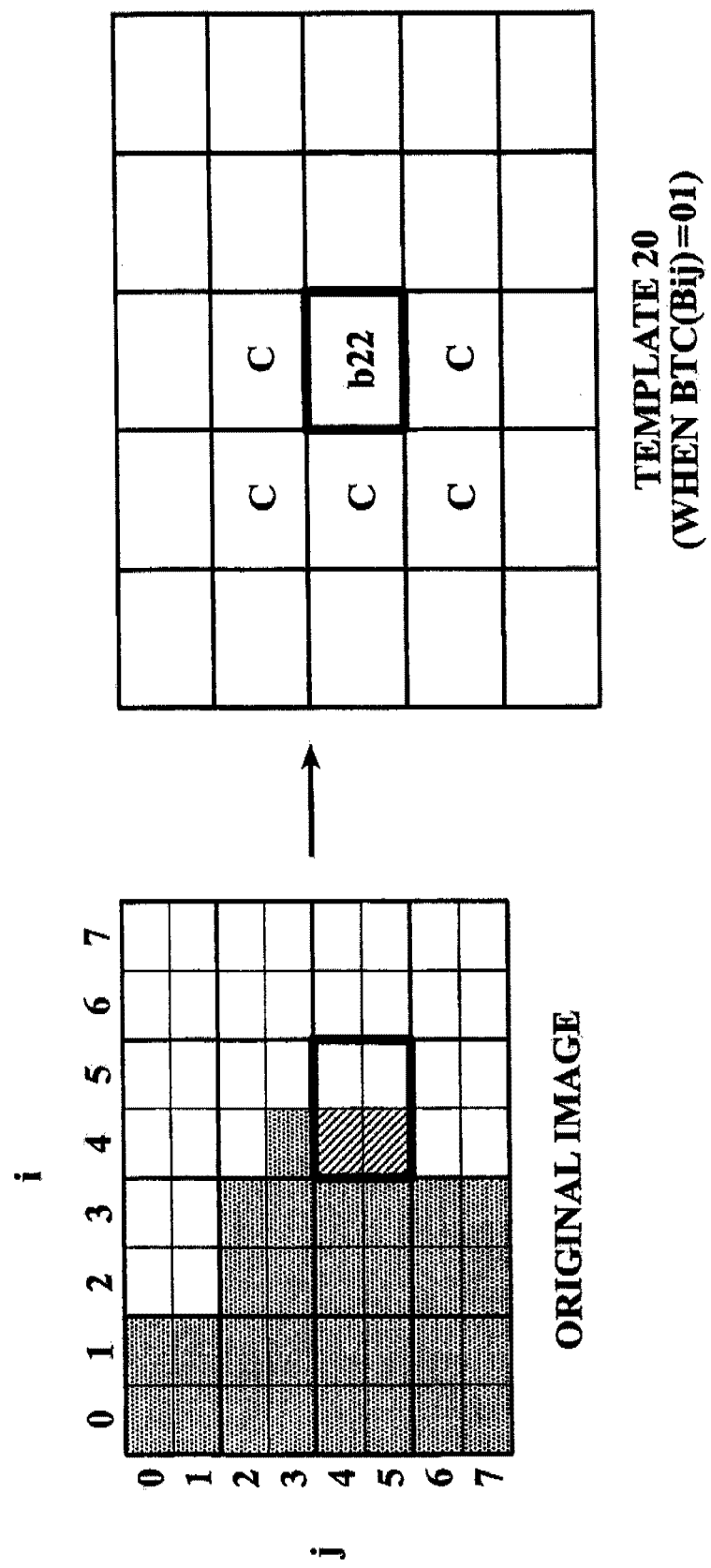

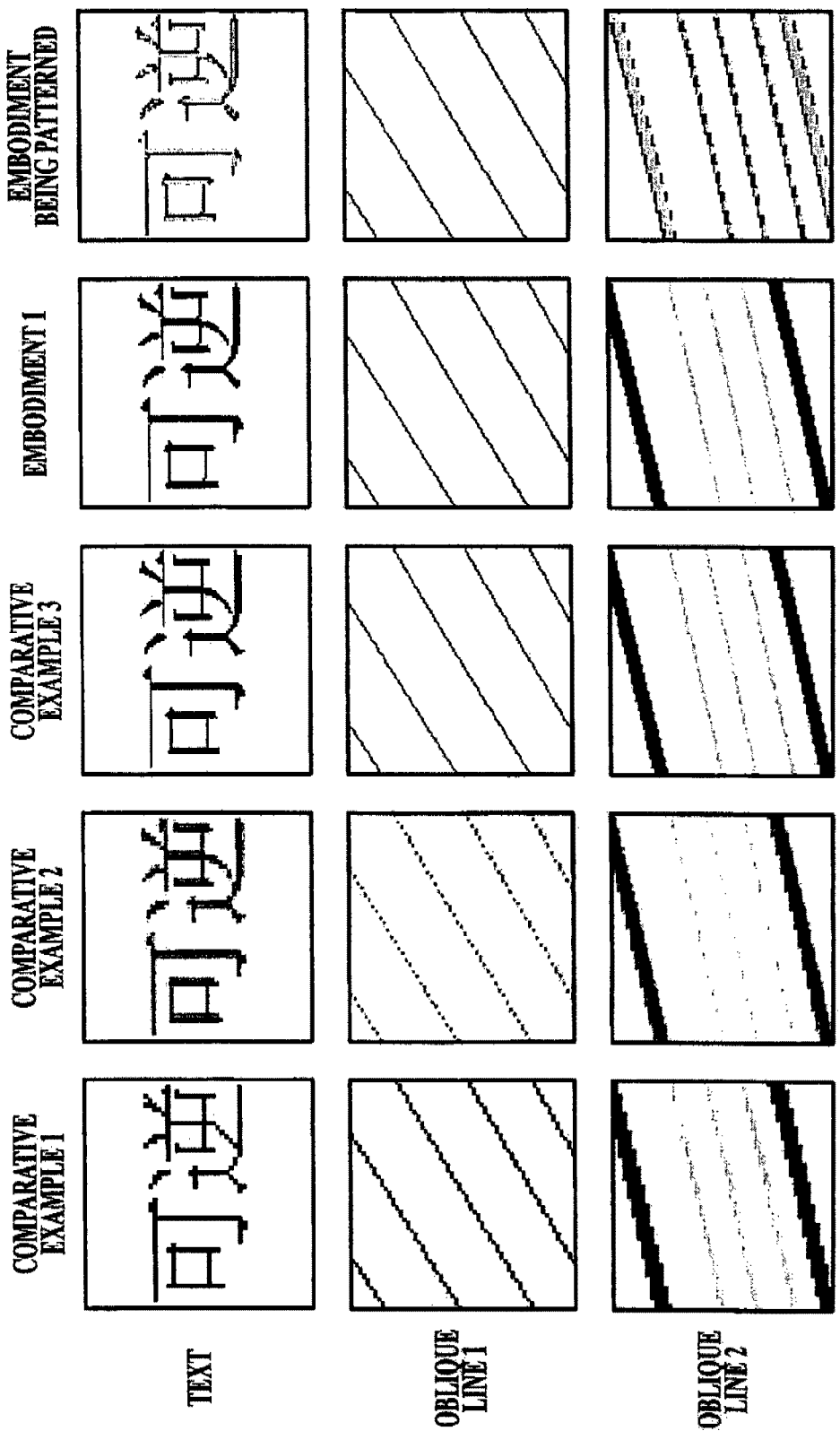

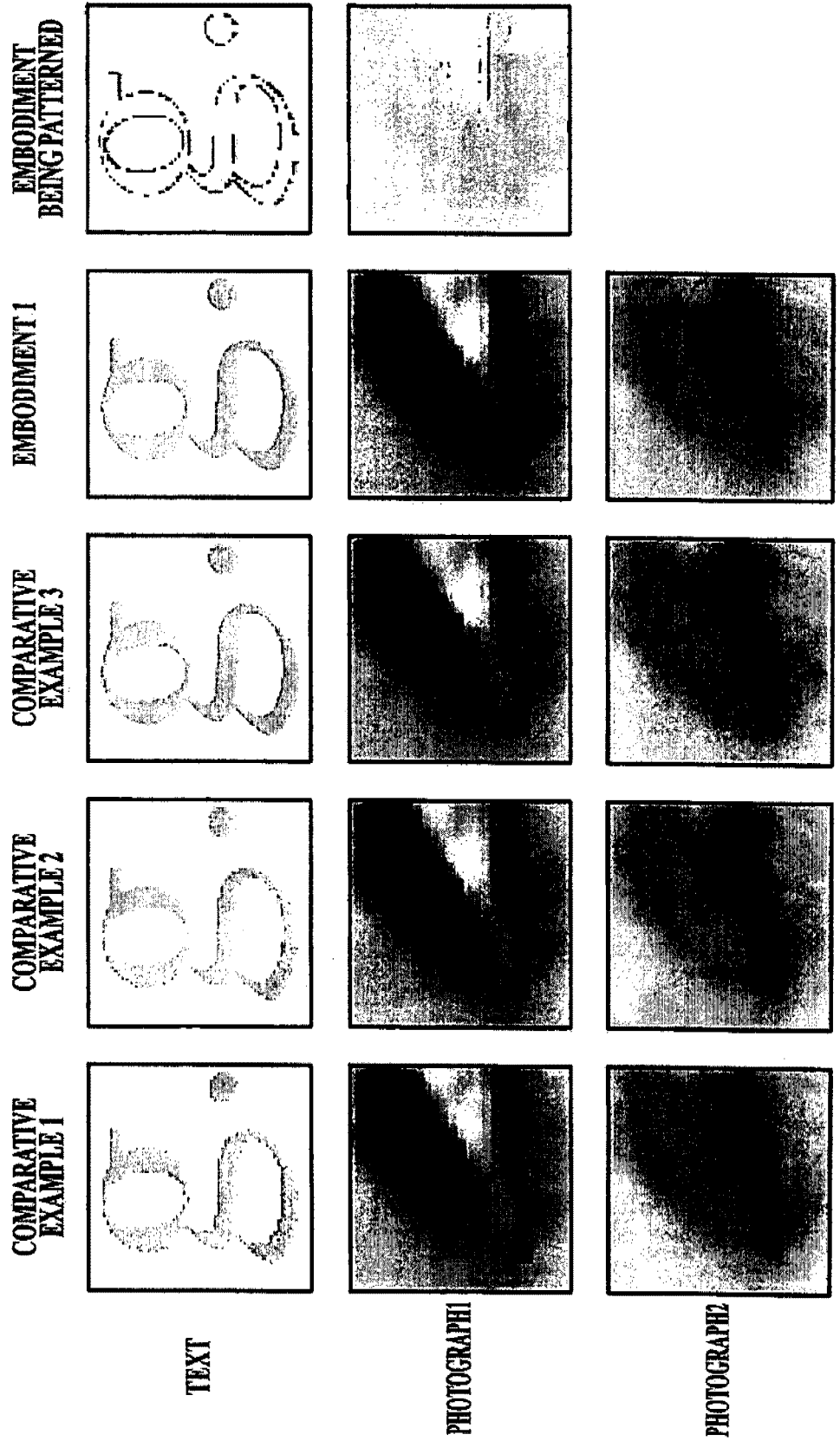

IMAGE PROCESSING APPARATUS, COMPRESSION METHOD, AND EXTENSION METHOD

BACKGROUND OF THE INVENTION

1. Field of the Invention

The present invention relates to an image processing apparatus, a compression method and an extension method.

2. Description of Related Art

In a copying machine or a printer, and the like, when an image is saved in a memory, compression processing is generally performed in order to reduce data amount. As a compression method thereof, JPEG (Joint Photographic Expert Group) or BTC (Block Truncation Coding), and the like are generally known. However, in a case where a region where a high resolution is required such as in the case of texts or graphics, and a region where a high gradation is required more than a high resolution such as in the case of images, are mixed in one image, the image quality is likely to be deteriorated when the entire image is compressed by JPEG because the texts and the graphics cannot be maintained with high resolution. As described above, the resolution and the gradation are incompatible when compression processing is performed by a single compression method, when the image has mixed regions in which an attribute of the image is different from one another.

Thus, a method is disclosed in which one image is divided into blocks to be performed with compression processing, and multiple coding processing such as JPEG and dual coding processing such as MH coding method, are switch from one another in a unit of blocks so as to be applied (see for example, Japanese Patent Application Laid-open Publication No. 8-9167).

However, there still is a case in which an image of texts or graphics and an image of photographic images are mixed in one block. For example, cases where texts written on a black board are included in a picture, or texts are included on a T-shirt worn by a person in a picture when the person is photographed. When the compression processing by JPEG is performed for the block as an image of a picture, the images of texts or graphics included in the image of the picture is altogether performed with JPEG, thus resulting in the loss of resolution.

SUMMARY OF THE INVENTION

The objects of the present invention include, performing compression processing according to the attribute of an image, and performing extension processing of an image which has been performed with the compression processing according to the attribute of the image.

To achieve the above object, an image processing apparatus reflecting one aspect of the present invention, comprises: an image compression conversion unit to quantize an image having attribute data for each pixel, wherein when a region has the attribute data of a photographic image, the image compression conversion unit quantizes the region by a BTC method, wherein when a region has the attribute data of other than the photographic image, and the region is a halftone region, the image compression conversion unit quantizes the region by the BTC method, and wherein when a region has the attribute data of other than the photographic image, and the region is a high resolution region, the image compression conversion unit generates a density pattern for the region to quantize the region according to the generated density pattern.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein:

FIG. 13 is a flow chart showing second quantization processing;

FIG. 14 is a diagram showing a correspondence relationship between a density pattern and the quantized data determined for the density pattern;

FIG. 15 is a flow chart showing the extension processing by an image extension conversion unit shown in FIG. 2;

FIG. 21 is a diagram showing a relationship between the quantized data and the density pattern predicted from the quantized data;

FIG. 23 is a diagram showing a relationship between a template used for the prediction processing of the density pattern H0, and the predicted density pattern when the template is matched;

FIG. 24 is a diagram showing a relationship between a template used for the prediction processing of the density pattern H1, and the predicted density pattern when the template is matched;

FIG. 25 is a diagram showing a relationship between a template used for the prediction processing of the density pattern H1, and the predicted density pattern when the template is matched;

FIG. 26 is a diagram showing a relationship between a template used for the prediction processing of the density pattern H2, and the predicted density pattern when the template is matched;

FIG. 27 is a diagram showing a relationship between a template used for the prediction processing of the density pattern H2, and the predicted density pattern when the template is matched;

FIG. 28 is a diagram showing a relationship between a template used for the prediction processing of the density pattern H3, and the predicted density pattern when the template is matched;

FIG. 29B is a diagram showing the original image and a template used for the prediction;

FIG. 30 is a diagram showing a processing result of the degeneracy compression processing and the degeneracy extension processing; and FIG. 31 is a diagram showing a processing result of the degeneracy compression processing and the degeneracy extension processing.

DETAILED DESCRIPTION OF THE PREFERRED EMBODIMENT

Hereinbelow, an embodiment of the present invention pertaining to the image processing apparatus, the compression method and the extension method is described in detail with reference to the drawings.

In the following, the embodiment of the present invention is described with reference to the drawings.

In the present embodiment, an example in which the present invention is applied to an MFP (Multi Function Peripheral) is described. The MFP is a complex type image forming apparatus comprising a plurality of functions such as a copying function, a printing function, and the like.

Figure 1:
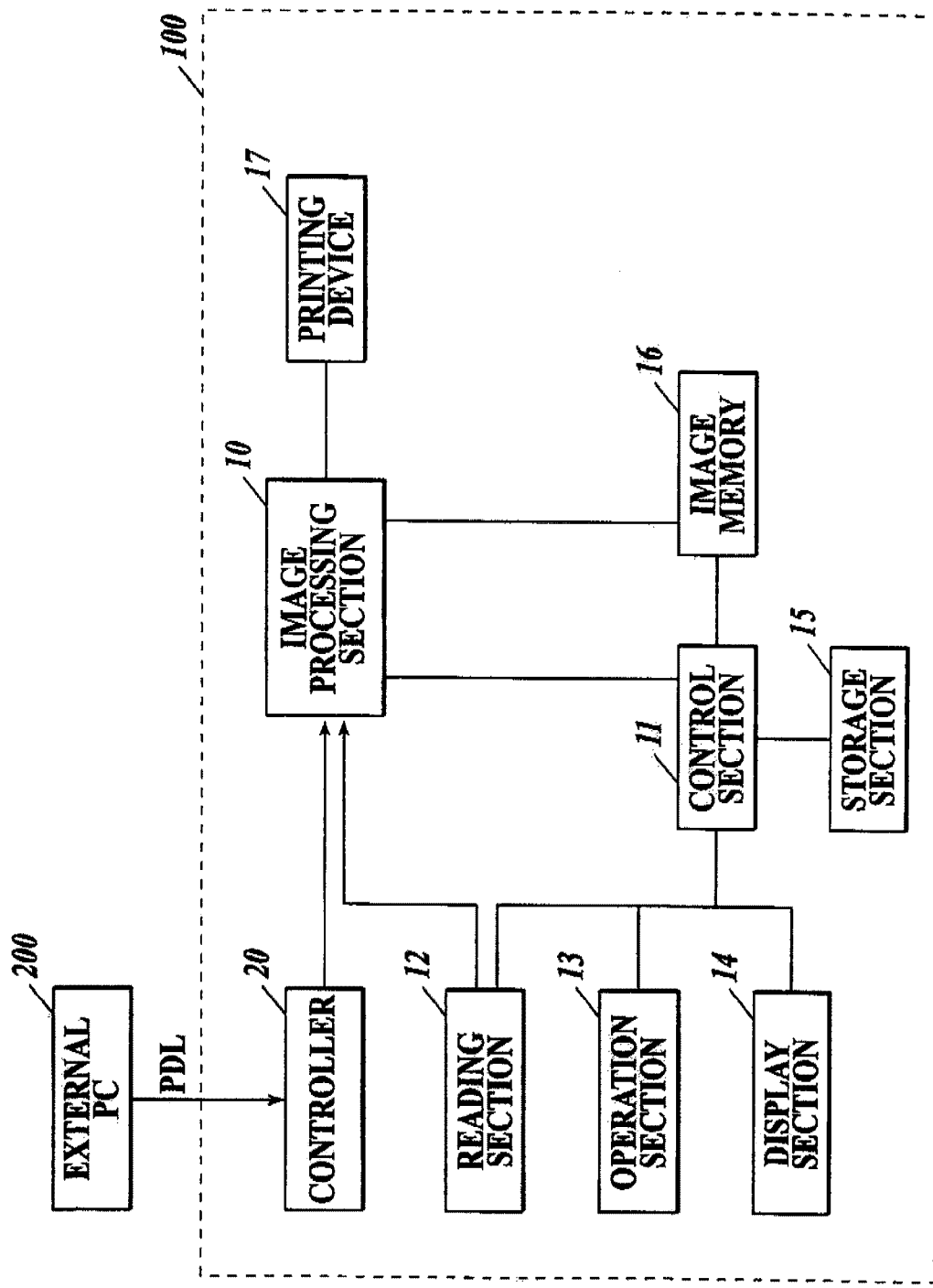
FIG. 1 is a diagram showing a functional configuration of an MFP (Multi Function Peripheral) according to the present embodiment.

FIG. 1 is a diagram showing a functional configuration of an MFP 100 according to the present embodiment.

The MFP 100 is connected to en external PC (personal computer) 200, and generates image data from data of PDL (Page Description Language) format transmitted from the external PC 200 to perform image processing for the generated image data, thus performs the printing of the processed data.

As shown in FIG. 1, the MFP 100 comprises a controller 20; an image processing section 10; a control section 11; a reading section 12; an operation section 13; a display section 14; a storage section 15; an image memory 16; and a printing device 17.

The controller 20 generates image data of each of the colors of C (cyan), M (magenta), Y (yellow), and K (black).

The data produced by an application of the external PC 200 is converted to the PDL format by printer driver software so as to be transmitted to the controller 20. The controller 20 performs rasterizing processing for the transmitted data of the PDL format so as to generate the image data. In the rasterizing processing, the controller 20 analyses the PDL command, allots a pixel for each unit of an image to be rendered (which is referred to as an object), so as to set a data value (a pixel value) for each of the colors of C, M, Y, and K for the allotted pixel.

Further, in the rasterizing processing, the controller 20 generates attribute data indicating the attribute of the image for each pixel, so as to accompany the generated attribute data with the image. The attribute of the image includes at least the texts, the graphics, and the images.

Incidentally, the configuration in which the controller 20 is embedded in the MFP 100 is described in the present embodiment, however, the controller 20 may be configured so as to be provided outside of the MFP 100.

The control section 11 comprises a CPU (Central Processing Unit), a RAM (Random Access Memory), and the like. The control section 11 performs various calculations and integral control of each section of the MFP 100, in cooperation with various processing programs stored in the storage section 15.

The reading section 12 comprises a scanner having an optical system and a CCD (Charge Coupled Device). The reading section 12 optically scans a document to generate an image (with an analog signal). The generated image is performed with various correction processing by a not shown processing section, and digitally converted so as to be output to the image processing section 10.

The operation section 13 is used to input an operation instruction by an operator, and comprises various keys, a touch panel configured integrally with the display section 14, and the like. The operation section 13 generates an operation signal according to the operation to output the generated operation signal to the control section 11.

The display section 14 displays an operation screen and the like on a display according to the control of the control section 11.

The storage section 15 stores various processing programs, parameters and setting data, and the like, required for the processing.

The image memory 16 stores the image data generated by the controller 20 and the image data generated by the reading section 12.

The printing device 17 performs the printing based on the image data for printing input from the image processing section 10. The image data for printing is image data which is performed with various image processing to the image data generated by the controller 20 or the reading section 12.

The printing device 17 performs printing of an electrophotographic method, and comprises for example, a feeding section, an exposure section, a developing section, a fixing section, and the like. During the printing, a laser light is irradiated by the exposure section based on the image data, so that an electrostatic latent image is formed on a photoconductive drum. Further, a toner image is formed on the photoconductive drum by developing processing performed by the developing section, the toner image is transferred to a sheet fed from the feeding section, thus fixing processing is performed by the fixing section.

Next, the image processing section 10 is described with reference to FIG. 2.

The image data input from the controller 20 or the reading section 12 is once saved in the image memory 16. Further, when a print instruction is performed by the operator, the image data is read out from the image memory 16 so as to be output to the printing device 17.

The image processing section 10 performs compression processing and a resolution conversion to a low resolution for the image data, when the image data is saved in the image memory 16. On the other hand, the image processing section 10 performs extension processing and a resolution conversion to bring back to the original resolution for the image data read out from the image memory 16. Subsequently, the image processing section 10 performs image processing such as density correction processing, screen processing, and the like, for the extended image data, and generates the image data for printing, so as to output the generated image data for printing to the printing device 17.

Figure 2:
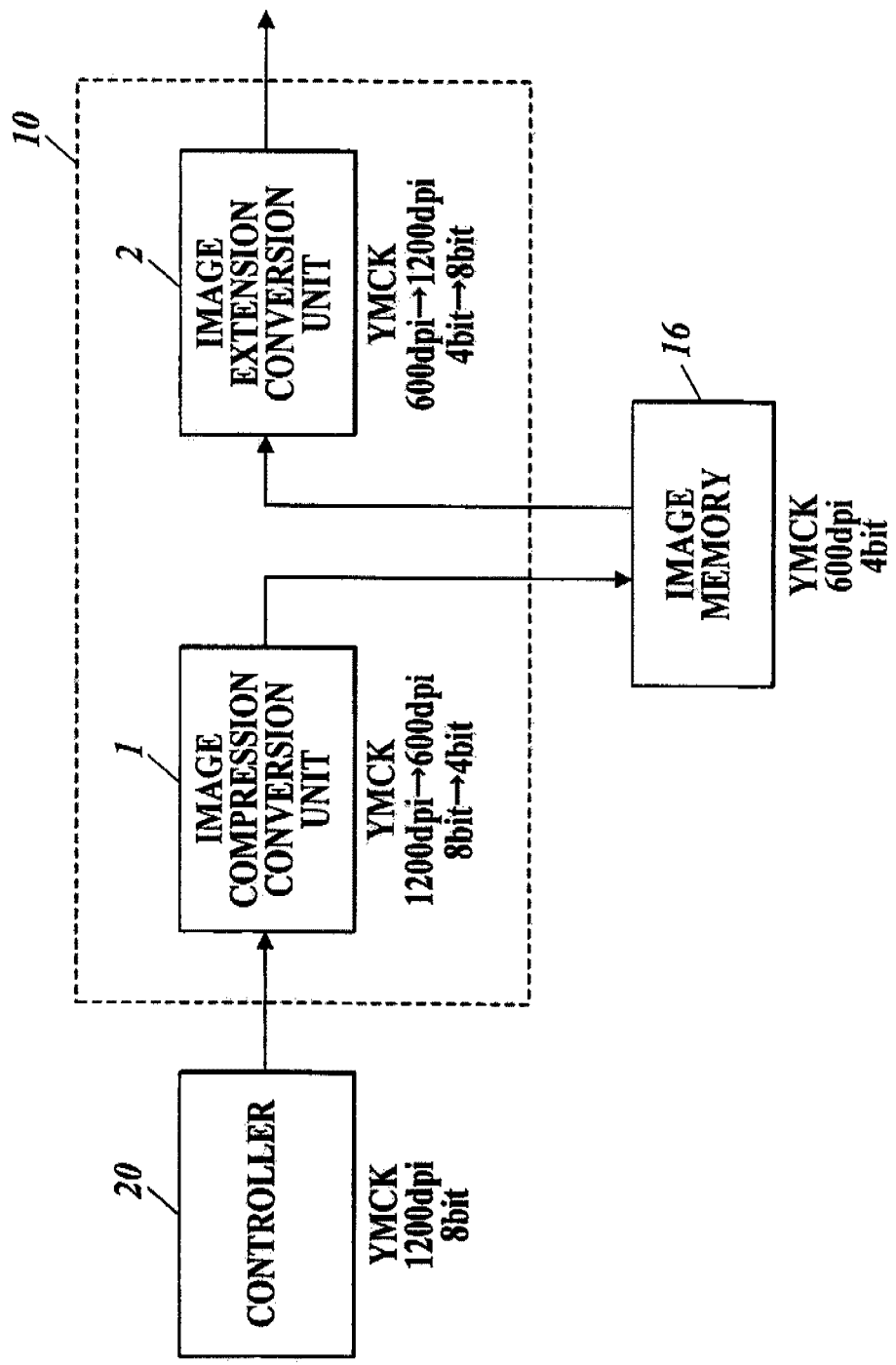
FIG. 2 is a diagram showing a configuration section to function mainly at compression processing and extension processing among image processing section in FIG. 1.

FIG. 2 is a diagram showing a configuration section to function mainly at the compression processing or the extension processing among the image processing section 10. As shown in FIG. 2, the image processing section 10 comprises an image compression conversion unit 1, and an image extension conversion unit 2. The image compression conversion unit 1 and the image extension conversion unit 2 are configured with a line memory and the like, to retain an image processing circuit and the image data.

[Compression Processing]

The compression processing executed by the image compression conversion unit 1 is described with reference to FIG. 3. In this processing, an original image which comprises data of a resolution of 1200 dpi and 8 bits per 1 pixel, is compressed to data of 4 bits per 1 pixel and performed with a resolution conversion to 600 dpi, so that the processing image is generated, as shown in FIG. 4. Incidentally, the compression processing is performed by a unit of blocks of 8×8 pixels. Thus, FIG. 4 shows the original image of 8×8 pixels (1200 dpi), and the processing image of 4×4 pixels (600 dpi) corresponding to the region thereof.

As shown in FIG. 4, each pixel of 8×8 pixels of the original image is represented by aij ($0 \leq i \leq 7$, $0 \leq j \leq 7$), and each pixel of 4×4 pixels of the processing image is represented by bij ($0 \leq i \leq 3$, $0 \leq j \leq 3$). Further, in the following description, the pixel values of a pixel of aij and bij may be indicted by aij, bij, respectively.

Figure 3:
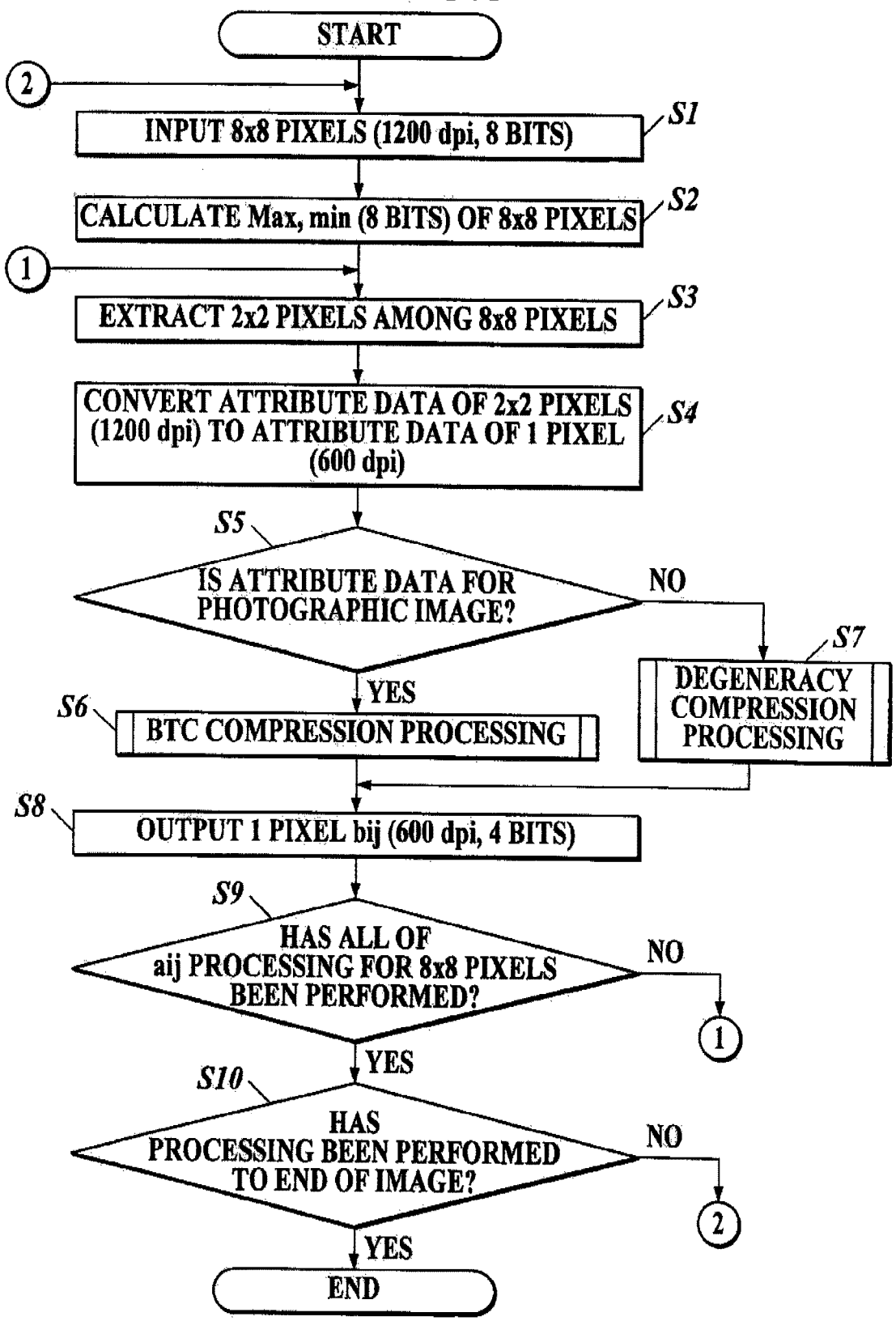
FIG. 3 is a flow chart showing the compression processing by an image compression conversion unit shown in FIG. 2.
Figure 4:
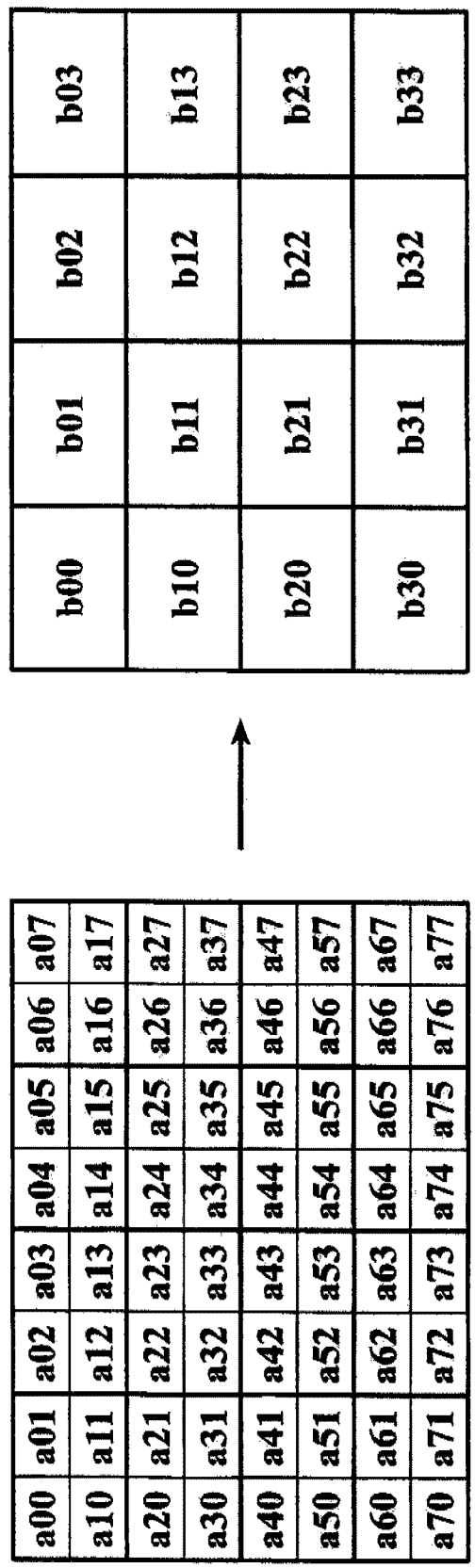
FIG. 4 is an original image before and after the compression processing and a processing image.

As shown in FIG. 3, the image compression conversion unit 1 extracts 8×8 pixels from the image which is an object of the compression (1200 dpi, 8 bits) so as to input the extracted 8×8 pixels (step S1). Subsequently, the image compression conversion unit 1 calculates the maximum value Max(8 bits), the minimum value min(8 bits) among the pixel values owned by each pixel aij of 8×8 pixels (step S2). The maximum value Max and the minimum value min of 8×8 pixels are also the maximum value Max and the minimum value min of the processing image of 4×4 pixels, having been performed with the compression processing.

When the Max, min are calculated, the image compression conversion unit 1 extracts the region of 2×2 pixels among 8×8 pixels as the processing object (step S3). Each pixel aij of the extracted 2×2 pixels respectively comprises attribute data. The image compression conversion unit 1 converts 4 pieces of the attribute data comprised by each pixel aij to 1 piece of the attribute data (step S4). The converted 1 piece of the attribute data is the attribute data which indicates the attribute of the image of 1 pixel bij of the processing image corresponding to the region of 2×2 pixels.

When the attribute data of each pixel aij of 2×2 pixels is described as TAG(aij), and the attribute data of the pixel bij of the processing image corresponding to the region of the 2×2 pixels is described as TAG(bij), the 4 pieces of TAG(aij) is converted to 1 piece of TAG(bij) according to the following conditions (1)-(3). Here, TAG=11, TAG=01, and TAG=00 indicate the attribute data of the texts, the graphics, and the images, respectively.

(1) When TAG(aij)=11 is included in any one of the 4 pieces of TAG(aij), TAG(bij)=11.

(2) When TAG(aij)=11 is not included in any one of the 4 pieces of TAG(aij), but TAG(aij)=01 is included therein, TAG(bij)=01.

(3) When all of the 4 pieces of TAG(aij) are TAG(aij)=00, TAG(bij)=00.

That is to say, a piece of the attribute data TAG(bij) to be converted is determined with the priority order of the texts, the graphics, and the images. In the region comprising the attribute of the images, the averaging of the pixel values is performed in the following processing. When the averaging is performed for the texts and the graphics, the resolution is to be lost, and the degree of the image deterioration is to be increased. Thus, in a case where pixel aij having the attribute of the texts or the graphics is contained even of 1 pixel in 2×2 pixels, the region of the 2×2 pixels is treated as the one of texts or graphics, thus the averaging is avoided.

When the attribute data is converted, the image compression conversion unit 1 judges whether the attribute of the region of the 2×2 pixels is of the images or not, that is to say, whether TAG(bij)=00 is satisfied or not, based on the attribute data after conversion (step S5). When TAG(bij)=00 is satisfied (step S5; Y), the image compression conversion unit 1 performs BTC compression processing for the region of the 2×2 pixels (step S6). On the other hand, when TAG(bij)=01 or TAG(bij)=11 is satisfied (step S5; N), the image compression conversion unit 1 performs degeneracy compression processing for the region of the 2×2 pixels (step S7).

First, the BTC compression processing is described with reference to FIG. 5. In the BTC compression processing, the region of the 2×2 pixels is quantized by a BTC method.

Figure 5:
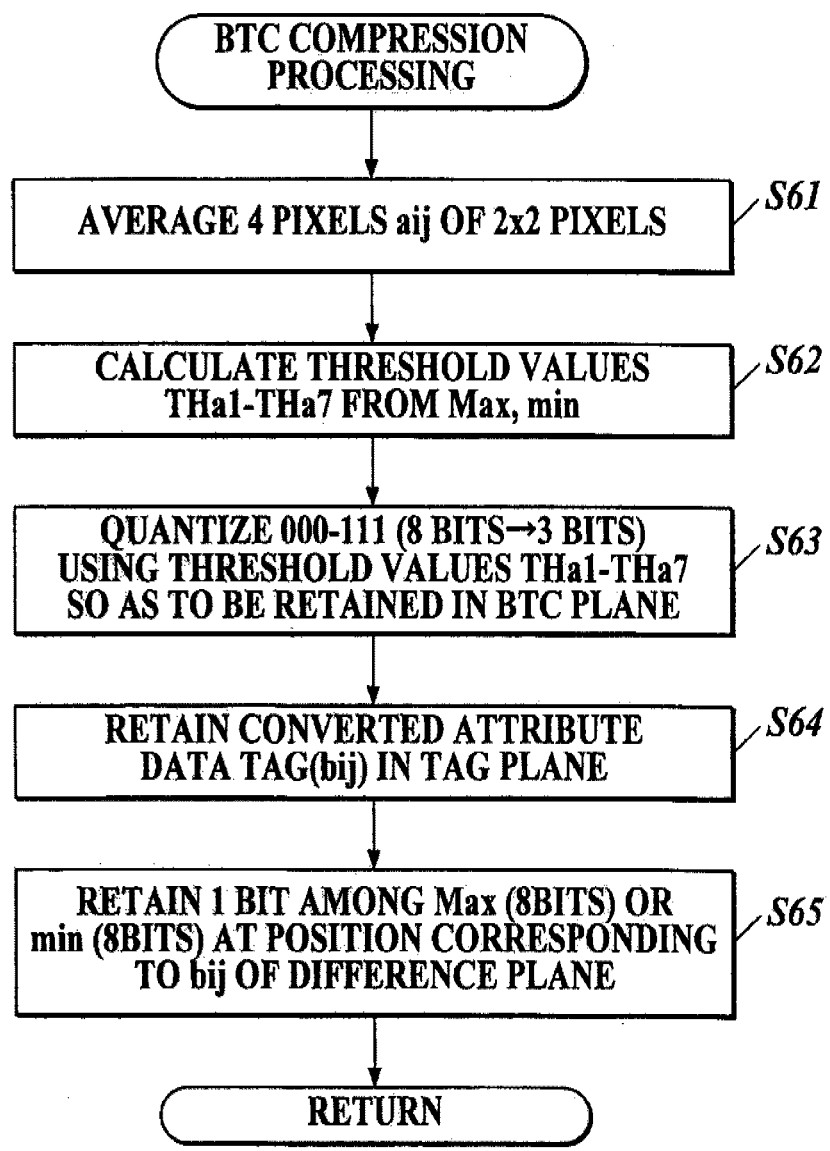
FIG. 5 is a flow chart showing a BTC compression processing.

As shown in FIG. 5, the image compression conversion unit 1 calculates an average value avr(bij) of the pixel value of each pixel aij of 2×2 pixels (step S61). The resolution conversion in which 4 pixel aij is to be 1 pixel bij is realized by this averaging. Subsequently, the image compression conversion unit 1 calculates the threshold values THa1-THa7 by the following formulae based on the maximum value Max and the minimum value min calculated in step S2 (step S62).

$$THa7 = min + (Max - min) \times 13/14$$

$$THa6 = min + (Max - min) \times 11/14$$

$$THa5 = min + (Max - min) \times 9/14$$

$$THa4 = min + (Max - min) \times 7/14$$

$$THa3 = min + (Max - min) \times 5/14$$

$$THa2 = min + (Max - min) \times 3/14$$

$$THa1 = min + (Max - min) \times 1/14$$

Figure 6:
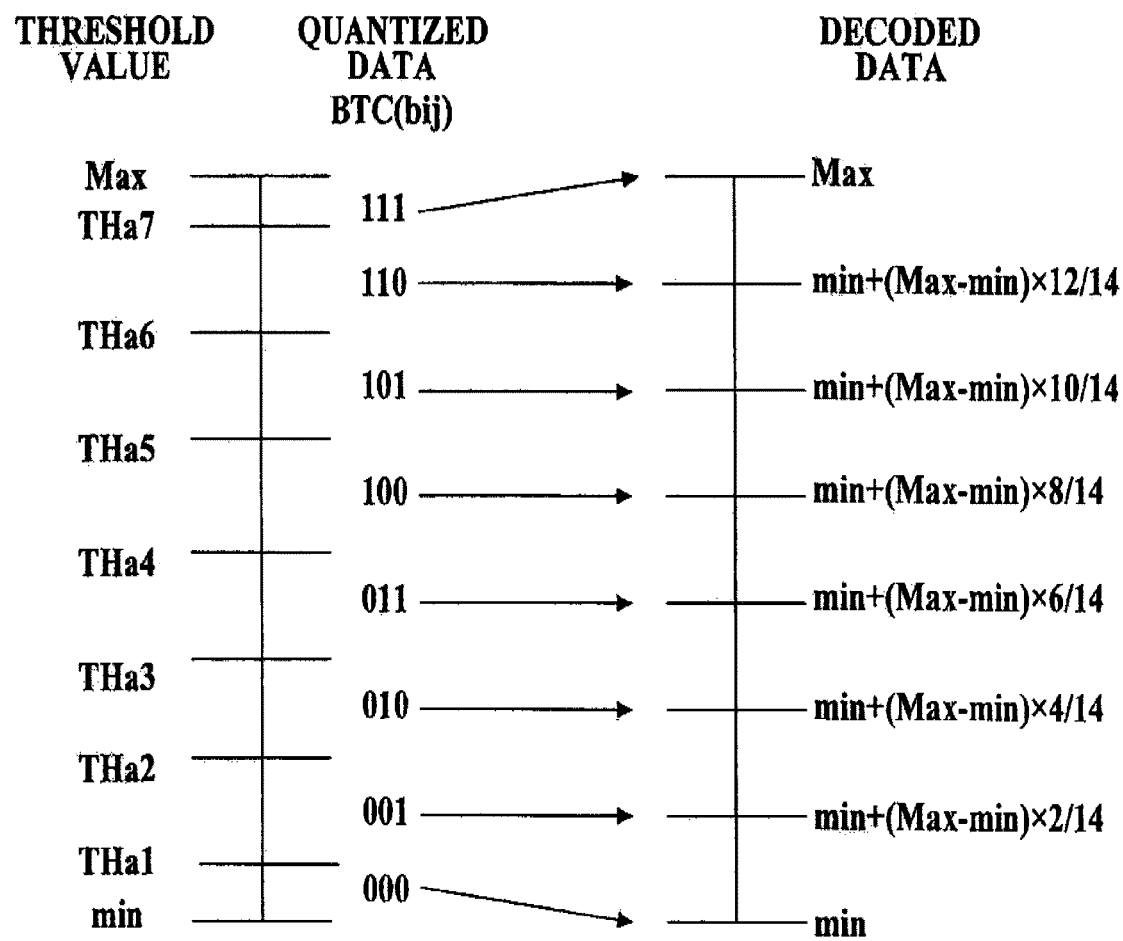
FIG. 6 a diagram showing a relationship between a threshold value, quantized data, and decoded data in a case where the BTC compression processing is performed.

Subsequently, the image compression conversion unit 1 quantizes the average values avr(bij) of the 8 bits by using the calculated threshold values THa1-THa7, so as to obtain quantized data of 3 bits of 000-111. This quantized data is described as BTC(bij). FIG. 6 shows the relationship between the threshold values THa1-THa7, and the quantized data BTC(bij), and this relationship is described as the following formulae.

When $THa7 \leq avr(bij) \leq Max$ is satisfied, BTC(bij)=111
When $THa6 \leq avr(bij) < THa7$ is satisfied, BTC(bij)=110
When $THa5 \leq avr(bij) < THa6$ is satisfied, BTC(bij)=101
When $THa4 \leq avr(bij) < THa5$ is satisfied, BTC(bij)=100
When $THa3 \leq avr(bij) < THa4$ is satisfied, BTC(bij)=011
When $THa2 \leq avr(bij) < THa3$ is satisfied, BTC(bij)=010
When $THa1 \leq avr(bij) < THa2$ is satisfied, BTC(bij)=001
When $min \leq avr(bij) < THa1$ is satisfied, BTC(bij)=000

That is to say, as shown in FIG. 6, the avr(bij) is converted to the quantized data BTC(bij) of 3 bits based on which density range determined by the Max, min, and THa1-THa7 the avr(bij) belongs to. This quantized data BTC(bij) is to be the pixel value of 1 pixel bij of the processing image.

The image compression conversion unit 1 saves the obtained quantized data BTC(bij) in the line memory or the image memory 16 (hereinbelow referred to as a memory in general), as a part of the processing image. The processing image comprises data of 4 bits per 1 pixel, thus a memory region to retain such processing image is formed in the memory. The image compression conversion unit 1 makes the region for retaining the quantized data BTC(bij) among the memory region retain the quantized data BTC(bij) (step S63).

Figure 7:
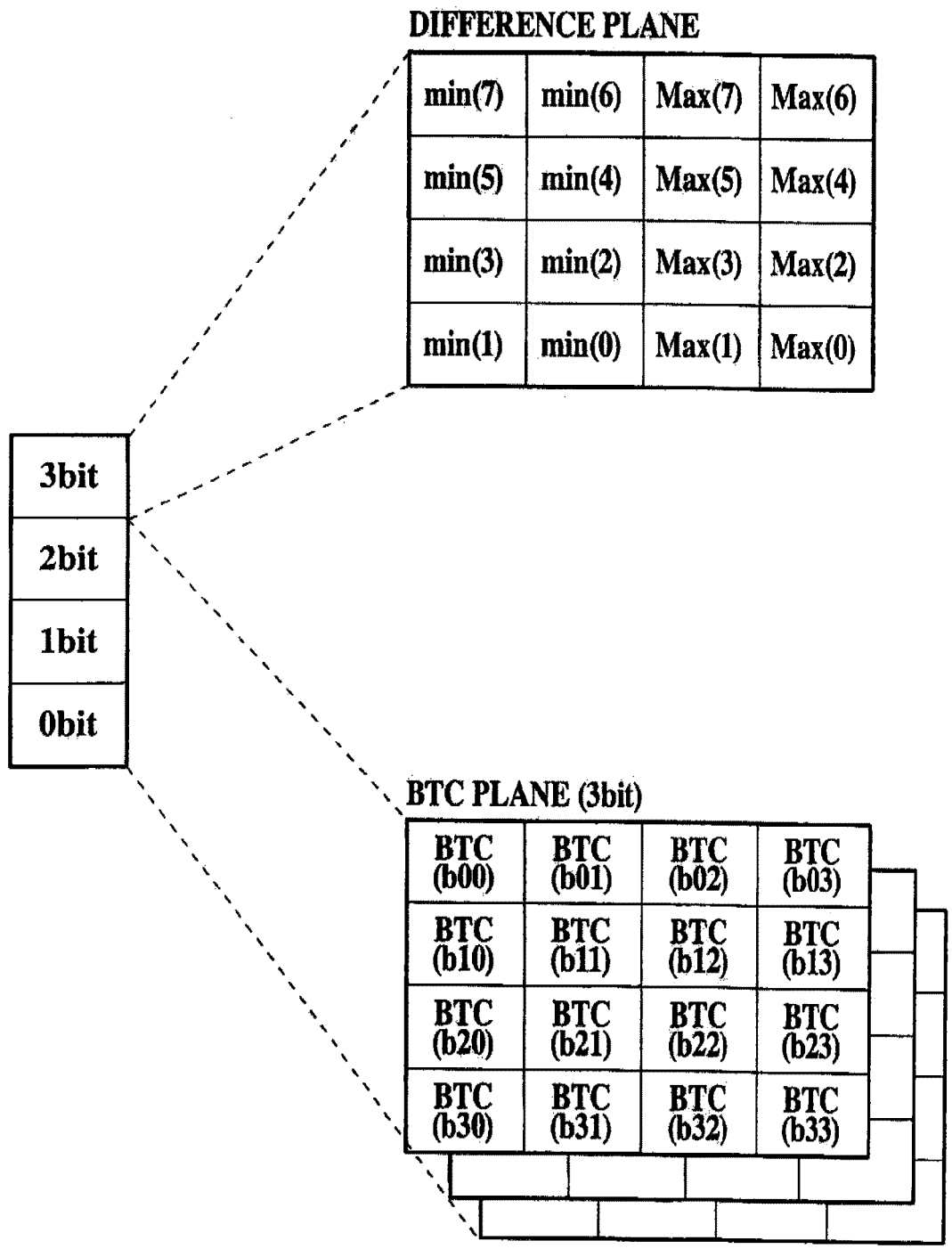
FIG. 7 is a data configuration of the processing image being performed with the BTC compression processing.

The data configuration of the processing image is described with reference to FIG. 7.

The data configuration of the processing image differs according to which of the BTC compression processing and the degeneracy processing has been performed. FIG. 7 shows the data configuration of the processing image when the BTC compression processing is performed for all pixels aij of 8×8 pixels. In order to retain the processing image comprising the data of 4 bits per 1 pixel bij, the memory region is formed for 4 data layers (which respectively is referred to as a plane) which respectively comprises 4×4 pixels per 1 pixel bij×1 bit, in the memory.

Among the 4 planes, the quantized data BTC(bij) is retained in the plane of 0-2 bits, and the plane is referred to as a BTC plane.

Further, the maximum value Max (8 bits), the minimum value min (8 bits) of 8×8 pixels of the original image are retained in the plane of 3 bits, and the plane is referred to as a difference plane. As shown in FIG. 7, the maximum value and the minimum value are described as Max(k), min(k) (wherein "k" indicates the bit position in the 8 bits, $0 \leq k \leq 7$), respectively. The Max(k), min(k) of 8 bits are retained at a position of 2×4 pixels respectively determined for Max(k), min(k) in the difference plane, in a state of being retained per 1 bit at a position determined by the bit position k in the 2×4 pixels.

Figure 8:
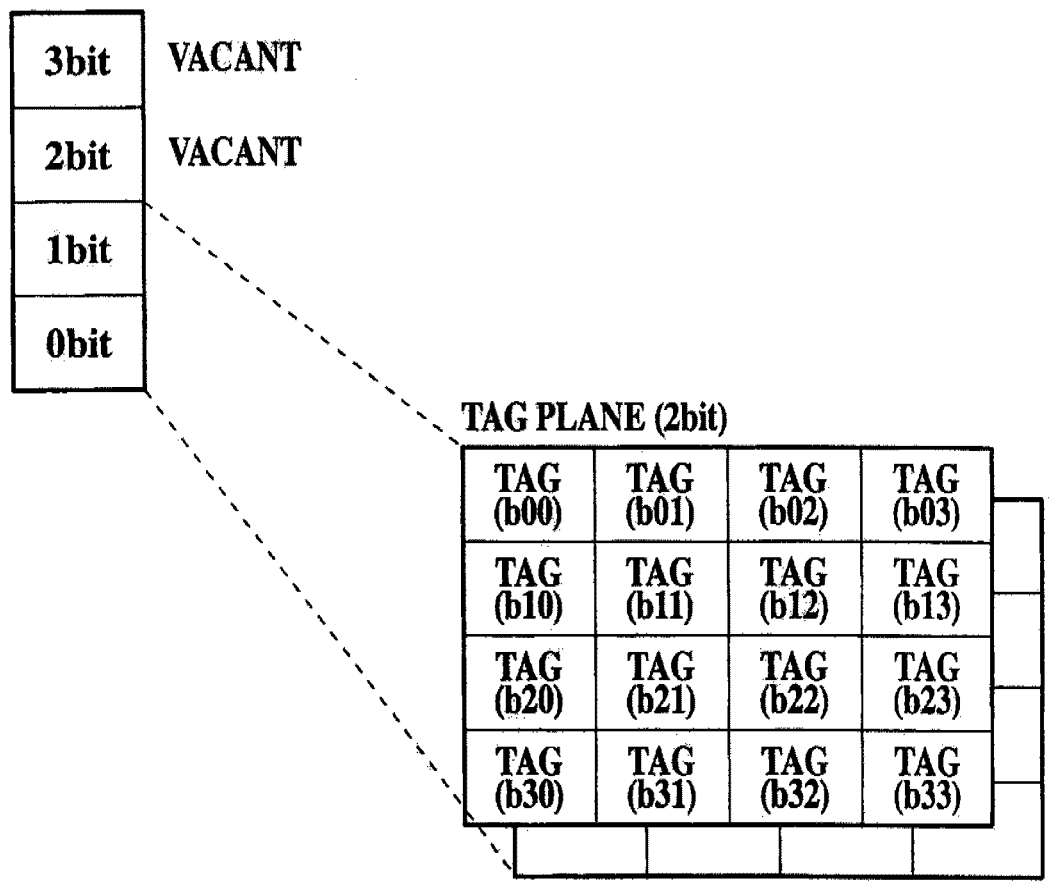
FIG. 8 is a data configuration of attribute data.

Further, in order to retain the attribute data of the processing image corresponding to the memory region of the above described processing image, the memory region corresponding to the 4 planes is formed in the memory as shown in FIG. 8. The attribute data TAG(bij) comprises 2 bits, thus the attribute data TAG(bij) only requires the memory region for 2 bits, that is to say, for 2 planes. However, the memory region for 4 bits, that is to say, for 4 planes are ensured for the convenience of memory design.

As shown in FIG. 8, the attribute data TAG(bij) of 2 bits is retained in the plane of 0, 1 bit, and the plane is referred to as a TAG plane. The plane of 2, 3 bits is respectively a vacant region.

When the image compression conversion unit 1 makes the BTC plane retain the quantized data BTC(bij), the image compression conversion unit 1 makes the above described TAG plane retain the converted attribute data TAG(bij) therein (step S64). Subsequently, the image compression conversion unit 1 extracts data value of 1 bit which is located at the bit position k corresponding to the pixel bij, among the data values of 8 bits of Max or min calculated in step S2 shown in FIG. 3, and makes the extracted data value be retained at a position corresponding to the pixel bij of the difference planed described in FIG. 7 (step S65).

When the above described processing is terminated, the processing returns to step S8 shown in FIG. 3, and the image compression conversion unit 1 outputs the processing image for 1 pixel bij (600 dpi, 4 bits) (step S8).

Subsequently, the image compression conversion unit 1 judges whether the compression processing has been performed for all pixels aij of 8×8 pixels extracted in step S1 (step S9). When there still is a pixel aij which has not been processed (step S9; N), the image compression conversion unit 1 returns to step S3, and newly repeats the processing of steps S3-S9 for 2×2 pixels among the unprocessed pixel aij. On the other hand, when the compression processing for all pixels aij of 8×8 pixels has been performed (step S9; Y), the image compression conversion unit 1 judges whether the compression processing has been terminated to an end of the image (step S10).

When there still is an unprocessed image portion (step S10; N), the image compression conversion unit 1 returns to step S1, newly extracts 8×8 pixels from the unprocessed image portion, and repeats the processing of steps S1-S10 for the extracted 8×8 pixels. Thus, when the compression processing has been terminated to the end of the image (step S10; Y), the processing is terminated.

Next, the degeneracy compression processing is described with reference to FIG. 9. In the degeneracy compression processing, different types of quantization methods are to be applied, depending on whether the region of the 2×2 pixels of the processing object is a halftone region or a high resolution region. The halftone region is an image region where the maintenance of high resolution is not particularly required, and is referred to image portions for example, having a halftone density, or where it is not halftone but the density between the adjacent pixels are approximately the same (the density difference is small), and the like. The high resolution region is an image region where the maintenance of high resolution is required, and is referred to image portions for example, of an edge portion and a thin line structure of an object, of an isolated point, and the like. The resolution is more emphasized than the gradation in the high resolution region, whereas the gradation is more emphasized than the resolution in the halftone region. As described above, the required image quality differs depending on the characteristics of the images, thus regions of 2×2 pixels having the attribute other than the images (photographic images) are divided into the high resolution region and the halftone region, thereby the quantization is performed by different methods, respectively.

When the following conditions (11)-(14) are satisfied, the region of 2×2 pixels are quantized by the BTC method as the halftone region.

(11) When there is at least 1 pixel which satisfies THa1<aij≦THa3 among 4 pixels aij

(12) When all 4 pixels aij satisfy aij≦THa1

(13) When all 4 pixels aij satisfy aij>THa3

(14) When (Max−min)<T ($0 \leq T \leq 255$) is satisfied

T is a difference between Max and min, that is to say, a threshold value set to judge whether the density difference in the region of 8×8 pixels is small or not. For example, a value of T=30, and the like, may be set.

By the conditions of (11)-(14), whether the region of aij of 2×2 pixels has a halftone density, the approximately the same density where the all density values are in the vicinity of the maximum value or the minimum value, or a density where the variation thereof is small.

On the other hand, when the following condition (2) is satisfied, the region of 2×2 pixels are quantized according to the density pattern of the particular region as the high resolution region.

(2) When a pixel which satisfies aij≦THa1 and a pixel which satisfies aij>THa3 are mixed in 4 pieces of aij By the condition (2), whether the density variation is large or not in the region of aij of 2×2 pixels can be judged.

Figure 9:
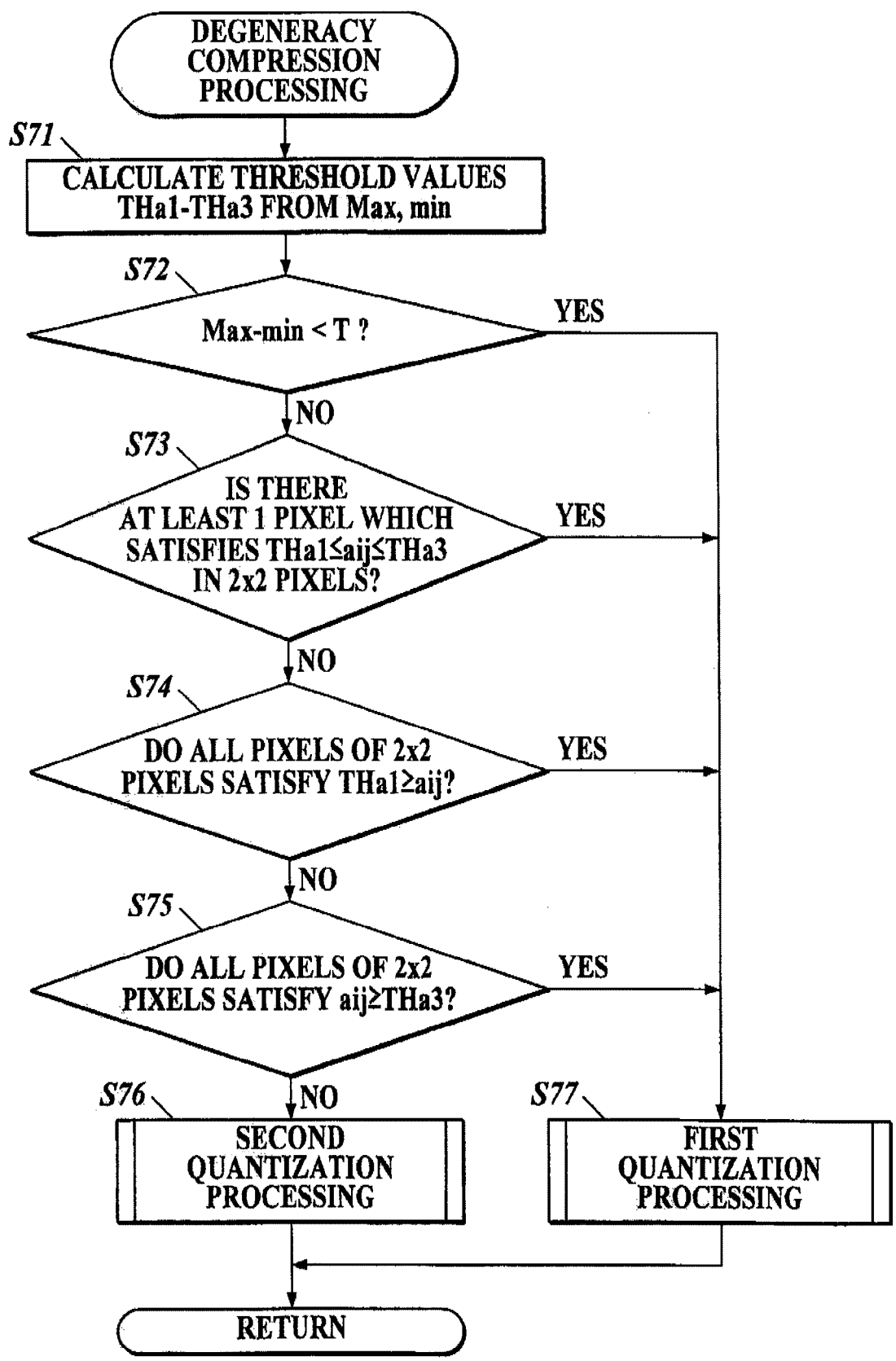
FIG. 9 is a flow chart showing degeneracy compression processing.

As the flow of the processing, the image compression conversion unit 1 calculates the threshold values THa1-THa3 using Max, min calculated in the processing of step S2 (see FIG. 3), as shown in FIG. 9 (step S71). The calculation formulae are shown below.

$$THa3 = min + (Max - min) \times 5/6$$

$$THa2 = min + (Max - min) \times 3/6$$

$$THa1 = min + (Max - min) \times 1/6$$

Subsequently, the image compression conversion unit 1 judges whether (Max−min)<T is satisfied or not, that is to say, whether the above condition (14) is satisfied or not (step S72). When (Max−min)<T is satisfied (step S72; Y), the above condition (14) is satisfied, thus the image compression conversion unit 1 moves on to the first quantization processing (step S77). Even when (Max−min)<T is not satisfied (step S72; N), when aij of 2×2 pixels is judged to comprise at least 1 pixel which satisfies THa1<aij≦THa3 (step S73; Y), the condition (11) is satisfied, thus the image compression conversion unit 1 moves on to the first quantization processing (step S77). Further, when all 4 pixels aij satisfy aij≦THa1 (step S74; Y), the condition (12) is satisfied, and when all 4 pixels aij satisfy aij>THa3 (step S75; Y), the condition (13) is satisfied, thus the image compression conversion unit 1 moves on to the first quantization processing (step S77).

On the other hand, when none of the conditions (11)-(14) is satisfied (step S73; N, step S74; N, step S75; N), it is when a pixel which satisfies aij≦THa1 and a pixel which satisfies aij>THa3 are mixed in the region of 2×2 pixels, and the above condition (2) is satisfied, thus the image compression conversion unit 1 moves on to the second quantization processing (step S76).

The first quantization processing is described with reference to FIG. 10. In the first quantization processing, the region of 2×2 pixels is quantized by the BTC method.

Figure 10:
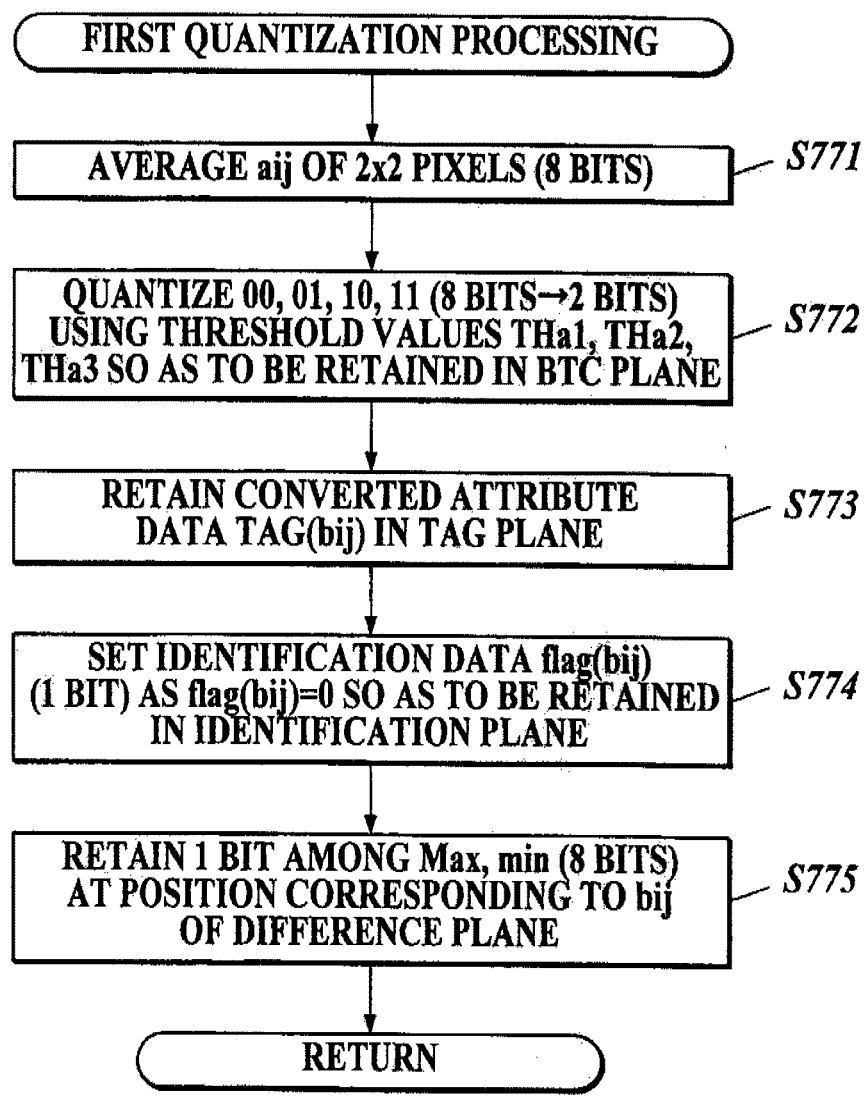
FIG. 10 is a flow chart showing first quantization processing.

As shown in FIG. 10, the image compression conversion unit 1 performs the averaging of aij of 2×2 pixels which satisfies the conditions (11)-(14), to calculate the average value avr(bij) thereof (step S771).

Figure 11:
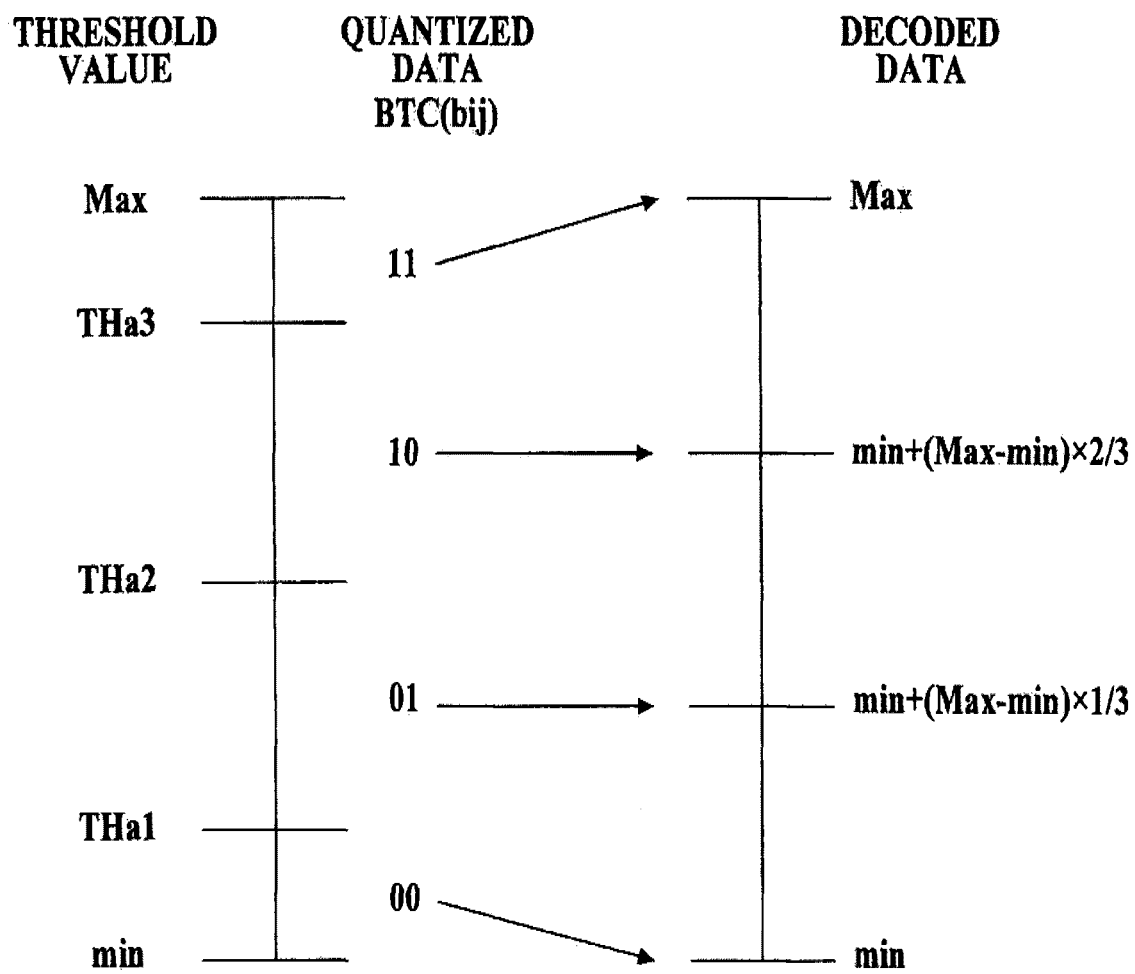
FIG. 11 is a diagram showing a relationship between a threshold value, quantized data, and decoded data in a case where the first quantization processing is performed.

Subsequently, the image compression conversion unit 1 quantizes the average value avr(bij) to data value of 2 bits of 00, 01, 10, 11, by using the threshold values THa1-THa3 calculated in the processing of step S71 (see FIG. 9). This quantized data is described as BTC(bij). FIG. 11 shows the relationship between the threshold values THa1-THa3 and BTC(bij), and the relationship is described by the following formulae.

When THa3≦avr(bij)≦Max is satisfied, BTC (bij)=11
When THa2≦avr(bij)<THa3 is satisfied, BTC (bij)=10
When THa1≦avr(bij)<THa2 is satisfied, BTC (bij)=01
When min≦avr(bij)<THa1 is satisfied, BTC (bij)=00

This quantization is the one by the BTC method which is performed in the same manner as in the BTC compression processing, only different in the compression rate. Further, it is also the same as in the BTC compression processing in that the resolution conversion is performed along with the quantization by the averaging before the quantization.

The image compression conversion unit 1 makes the obtained BTC(bij) be retained in the BTC plane in the line memory or the image memory 16 as a part of the processing image (step S772).

Figure 12:
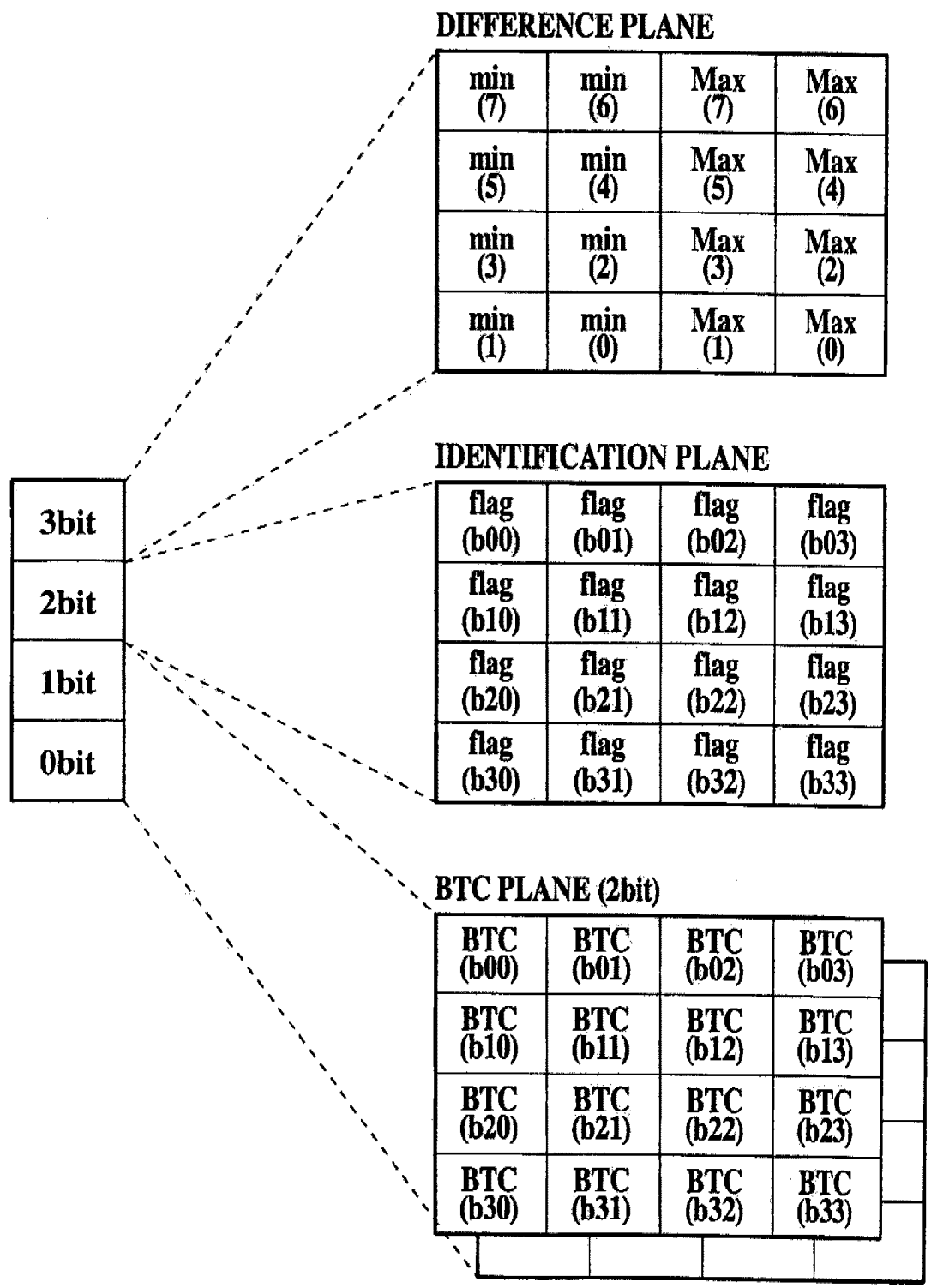
FIG. 12 is a data configuration of the processing image being performed with the degeneracy compression processing.

As described before, the data configuration of the processing image which has been performed with degeneracy compression processing is different from the data configuration of the processing image which has been performed with the BTC compression processing. The data configuration of the processing image which has been performed with degeneracy compression processing is described with reference to FIG. 12. FIG. 12 shows the data configuration of the processing image when the entire aij of 8×8 pixels has been performed with the degeneracy compression processing. 1 pixel bij is to save the processing image of 4 bits, thus the memory region is formed for 4 data layers (which respectively is referred to as a plane) which respectively comprises 4×4 pixels per 1 pixel bij×1 bit.

In the 4 planes, BTC(bij) of 2 bits is retained in the plane of 0, 1 bit, and the plane is referred to as the BTC plane.

Identification data flag(bij) of 1 bit is retained in the plane of 2 bits, and the plane is referred to as the identification plane. The identification data flag(bij) is data which is used to identify whether it is a halftone region or a high resolution region. The method of the quantization used in the compression processing can be identified by referring to this identification data flag (bij). Flag(bij)=0 indicates that aij of 2×2 pixels corresponding to pixel bij is performed with the first quantization processing as the halftone region, and the flag (bij)=1 indicates that the aij is performed with the second quantization processing as the high resolution region.

The maximum value Max(8 bits) and the minimum value min (b bits) in 8×8 pixels of the original image is retained in the plane of 3 bits, and the plane is referred to as the difference plane. The difference plane is the same as the difference plane in the processing image which has been performed with the BTC compression processing.

That is to say, this data configuration is different from that of the processing image which has been performed with the BTC compression processing in that the identification plane is included in the processing image which has been performed with the degeneracy compression processing. In the processing image which has been performed with the BTC compression processing, the identification plane does not exist, thus the BTC plane is allotted with the memory region for the identification plane, thereby the compression rate is intended to be reduced.

Incidentally, FIG. 12 shows the data configuration in the case where the degeneracy compression processing is performed for the entire aij of 8×8 pixels. The BTC compression processing and the degeneracy compression processing can be switched to and from each other by the unit of 2×2 pixels, thus the data configuration of the processing image may also be switched by the unit of 2×2 pixels.

The processing image which has been performed with the degeneracy compression processing also retains the attribute data of the processing image in the memory. As shown in FIG. 8, the memory region for 4 planes including the TAG plane is formed. The image compression conversion unit 1 retains the attribute data TAG(bij) of bij of the processing image which is converted from the attribute data of aij of 2×2 pixels, in the TAG plane (step S773).

Subsequently, the image compression conversion unit 1 sets the identification data flag(bij) of bij of the processing image corresponding to aij of 2×2 pixels to flag(bij)=0, so as to be retained in the position corresponding to bij of the above described identification plane (step S774). Further, the image compression conversion unit 1 extracts the data value of 1 bit located at the bit position k corresponding to bij, from the data value of 8 bits of Max or min calculated in step S2 shown in FIG. 3, so as to be retained in the position corresponding to bij of the difference plane shown in FIG. 12 (step S775).

When the above described processing has been terminated, the processing is returned to step S8 shown in FIG. 3. The processing performed after step S8 is the same as described above, thus the description thereof is omitted.

Subsequently, the second quantization processing is described with reference to FIG. 13. In the second quantization processing, a density pattern of the region of 2×2 pixels is produced, thus the quantization is performed according to the produced density pattern.

As shown in FIG. 13, the image compression conversion unit 1 performs binarization for the pixel value of aij of 2×2 pixels which satisfies the condition (2) according to the following conditions, so as to produce the density pattern in which the data value of 0 or 1 is determined for 4 pixels of 2×2 pixels (step S761).

When aij>THa3 is satisfied, aij=1
When aij≦THa1 is satisfied, aij=0
When the condition (2) is satisfied, the pixel of aij>THa3 is approximate to the maximum value Max, and the pixel of aij≦THa1 is approximate to the minimum value min. Accordingly, the binarization is performed and the value of 0, 1 is set to the position of each pixel aij, thereby the density variation in the region of 2×2 pixels can be patterned.

Subsequently, the image compression conversion unit 1 performs quantization for data value of 2 bits of 00, 01, 10, 11 according to the produced density pattern. This quantized data is described as BTC(bij). To put it concretely, the density patterns are previously sort out into several groups, and quantized data 00, 01, 10, 11 is allotted for each group. The image compression conversion unit 1 obtains quantized data BTC (bij) corresponding to the density pattern produced for aij of 2×2 pixels. Thereby the resolution conversion can also be realized.

Here, as shown in FIG. 14, an example in which the density pattern is sort out into 4 groups of H0-H3, and quantized data 00, 01, 10, 11 is allotted to each group is described.

As shown in FIG. 14, the group of density pattern H0 is a group which includes only 1 of aij=1, among aij of 2×2 pixels. When the density pattern H0 is satisfied, the aij of 2×2 pixels is quantized to BTC(bij)=00.

Further, the groups of density patterns H1, H2 are groups which include 2 of aij=1, respectively. As shown in FIG. 14, the density patters H1 or H2 is determined according to which position aij=1 is located. When the density pattern H1 is satisfied, the aij of 2×2 pixels is quantized to BTC(bij)=01, and when the density pattern H2 is satisfied, the aij is quantized to BTC(bij)=10.

The group of density pattern H3 is a group which include 3 of aij=1. When the density pattern H3 is satisfied, the aij of 2×2 pixels is quantized to BTC(bij)=11.

At the time of decoding, the density pattern is predicted from the value of the quantized data BTC(bij). The density pattern in which the density of 2×2 pixels is the same (the number of 0, 1 included in the density pattern is the same) is quantized as the same group, thereby the same density can be expressed in the region of 2×2 pixels even when the position of 0, 1 is predicted incorrectly. Accordingly, an effect can be obtained in that the image quality deterioration is less likely to be observed even when an error has been generated.

Incidentally, instead of sorting the density pattern by the number of aij=1, the density pattern can alternatively be sorted into groups by the lining position of 0, 1 and the quantized data may be allotted to each group.

The image compression conversion unit 1 retains the obtained quantized data BTC(bij) in the BTC plane shown in FIG. 12 (step S762). Subsequently, the image compression conversion unit 1 retains the converted attribute data TAG(bij) in the TAG plane (step S763). Further, the image compression conversion unit 1 sets the identification data flag(bij) of quantized pixel bij to flag(bij)=1, so as to be retained in the identification plane shown in FIG. 12 (step S764). Further, the image compression conversion unit 1 extracts the data value of 1 bit located at the bit position k corresponding to bij, from the data value of 8 bits of Max or min calculated in step S2 shown in FIG. 3, so as to be retained in the position corresponding to bij of the difference plane shown in FIG. 12 (step S765).

When the above described processing has been terminated, the processing is returned to step S8 shown in FIG. 3. The processing performed after step S8 is the same as described above, thus the description thereof is omitted.

[Extension Processing]

Subsequently, the extension processing by the image extension conversion unit 2 is described with reference to FIG. 15.

Figure 16:
FIG. 16 is a processing image before and after the extension processing and an uncompressed image.

In the extension processing, the processing image of 1 pixel 4 bits is decoded as shown in FIG. 16, thus uncompressed image comprising data of 1 pixel 8 bits is obtained. The extension processing is performed in a processing unit of 4×4 pixels (bij) corresponding to 8×8 pixels (aij) which is a processing unit of the compression processing. Further, the processing image of 600 dpi is performed with resolution conversion, and the uncompressed image is to have the resolution of 1200 dpi.

As shown in FIG. 15, the image extension conversion unit 2 extracts the processing image which is the object of extension by the processing unit of 4×4 pixels to be input (step P1). Subsequently, the image extension conversion unit 2 obtains Max(k), min(k) from the difference plane of the processing image of 4×4 pixels, to dispose them in the bit order so as to uncompress the data of the maximum value Max, and the minimum value min (step P2).

Subsequently, the image extension conversion unit 2 extracts bij of 1 pixel among the processing image of 4×4 pixels as an attention pixel (step P3). The image extension conversion unit 2 obtains the attribute data TAG(bij) corresponding to bij of the extracted 1 pixel from the TAG plane, and judges whether the attribute of the attention pixel bij is of a photographic image or not, that is to say, whether TAG(bij) =00 is satisfied or not, based on the attribute data TAG(bij) (step P4). When TAG(bij)=00, and the attribute is of a photographic image (step P4; Y), the image extension conversion unit 1 moves on to BTC extension processing (step P5). On the other hand, when TAG(bij)=01 or 10 and the attribute is of a text or a graphic, which are other than a photographic image, the image extension conversion unit 2 moves on to the degeneracy extension processing (step P6).

First, the BTC extension processing is described with reference to FIG. 17.

Figure 17:
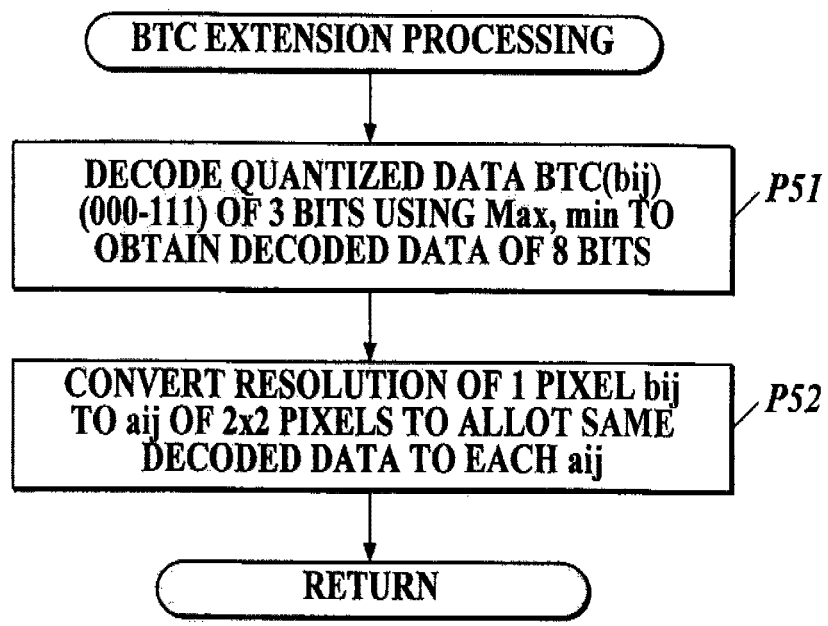
FIG. 17 is a flow chart showing a BTC extension processing.

As shown in FIG. 17, the image extension conversion unit 2 decodes the quantized data BTC(bij) of 3 bits by using the uncompressed Max, min so as to obtain decoded data of 8 bits (step P51). At this point, the image extension conversion unit 2 divides 1 pixel bij into aij of 2×2 pixels to perform the resolution conversion, and allots the decoded data of 8 bits to the aij of 2×2 pixels (step P52). That is to say, the entire decoded data value of aij of 2×2 pixels has the same value.

FIG. 6 shows the relationship between the quantized data BTC(bij) and the decoded data in the BTC decoding processing, and the relationship is described by the following formulae.

When BTC(bij)=111 is satisfied, aij=Max
When BTC(bij)=110 is satisfied, aij=min+(Max−min)× 12/14
When BTC(bij)=101 is satisfied, aij=min+(Max−min)× 10/14
When BTC(bij)=100 is satisfied, aij=min+(Max−min)×8/ 14

When BTC(bij)=011 is satisfied, aij=min+(Max−min)×6/14

When BTC(bij)=010 is satisfied, aij=min+(Max−min)×4/14

When BTC(bij)=001 is satisfied, aij=min+(Max−min)×2/14

When BTC(bij)=000 is satisfied, aij=min

When the decoded data is obtained, the processing is moved on to step P7 shown in FIG. 15, and the image extension conversion unit 2 outputs decoded aij (1200 dpi, 8 bits) of 2×2 pixels (step P7).

Subsequently, the image extension conversion unit 2 accompanies the attribute data accompanied with 1 pixel bij (600 dpi) before the decoding, with the each pixel of the decoded aij of 2×2 pixels as the attribute data, so as to be converted to the attribute data corresponding to 2×2 pixels (1200 dpi) (step P8).

Subsequently, the image extension conversion unit 2 judges whether the entire bij of 4×4 pixels which is the processing object, has been performed with the extension processing or not (step P9). When there is pixel bij which has not yet been processed (step P9; N), the image extension conversion unit 2 returns to step P3, and newly repeats the processing in steps P3-P9 for 1 pixel among the unprocessed bij as the processing object. On the other hand, when the entire bij of 4×4 pixels has been processed (step P9; N), the image extension conversion unit 2 judges whether the extension processing has been terminated to an end of the image (step P10).

When there still is an unprocessed image portion (step P10; N), the image extension conversion unit 2 returns to step P1, newly extracts 4×4 pixels from the unprocessed image portion, and repeats the processing of steps P1-P10 for the extracted 4×4 pixels. Thus, when the extension processing has been terminated to the end of the image (step P10; Y), the processing is terminated.

Next, the degeneracy extension processing is described with reference to FIG. 18.

Figure 18:
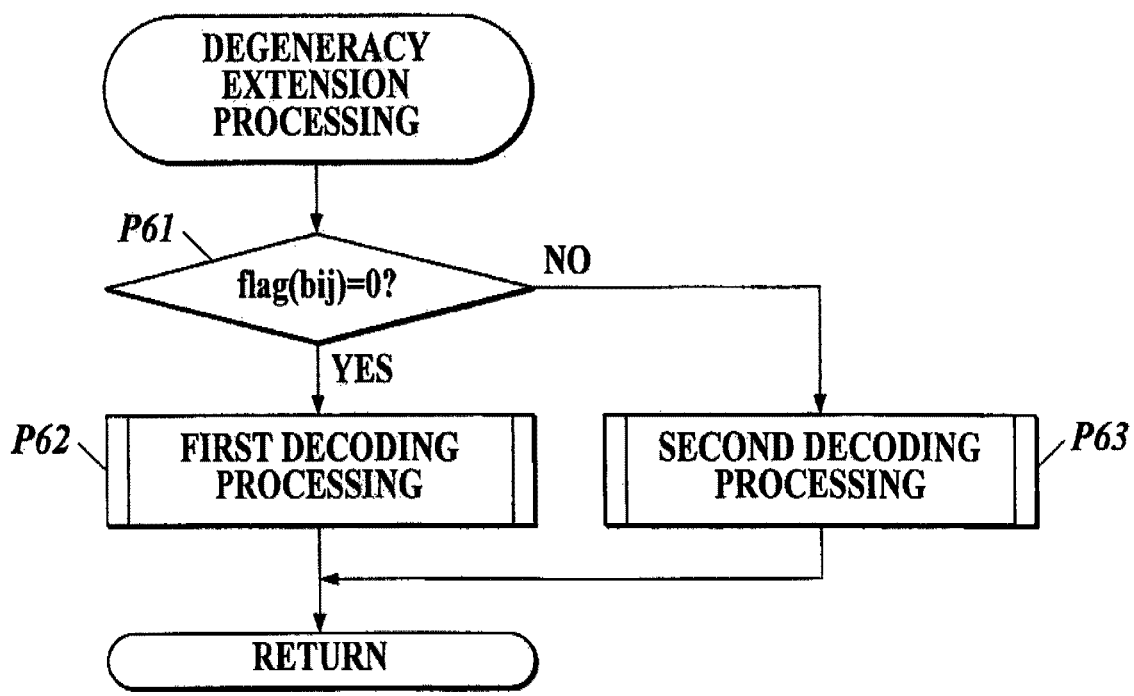
FIG. 18 is a flow chart showing degeneracy extension processing.

As shown in FIG. 18, the image extension conversion unit 2 obtains the identification data flag(bij) retained in the identification plane for the attention pixel bij. When flag(bij)=0 is satisfied (step P61; Y), the attention pixel bij is judged to be the halftone region, and the first decoding processing is executed (step P62). On the other hand, when flag(bij)=1 is satisfied (step P61; N), the attention pixel bij is judged to be the high resolution region, and the second decoding processing is executed (step P63).

Figure 19:
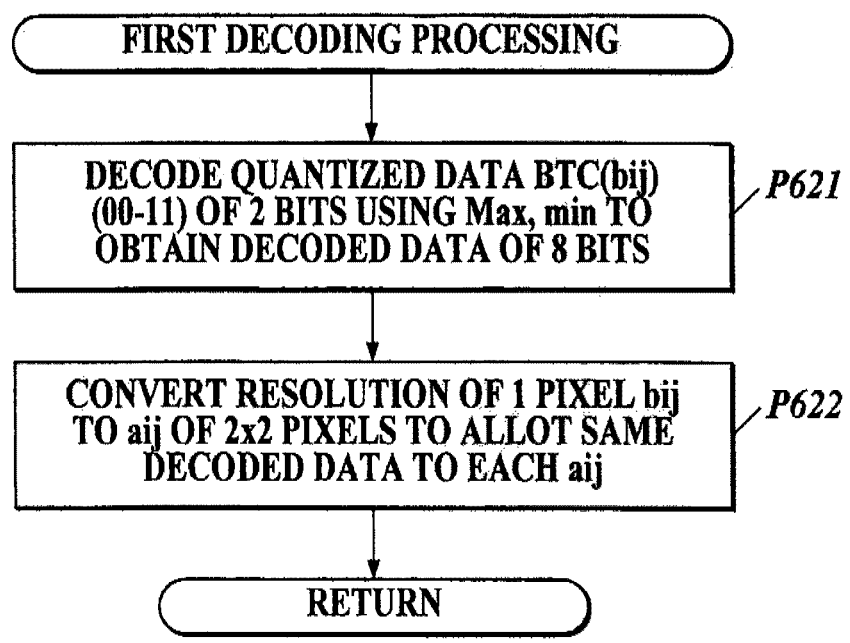
FIG. 19 is a flow chart showing first decoding processing.

The first decoding processing is described with reference to FIG. 19. In the first decoding processing, the quantized data BTC(bij) is decoded by the decoding method corresponding to the quantization method used in the first quantization processing. As shown in FIG. 19, the image extension conversion unit 2 decodes the quantized data BTC(bij) of 2 bits by using the uncompressed Max, min so as to obtain decoded data of 8 bits (step P621). At this point, the image extension conversion unit 2 divides 1 pixel bij into aij of 2×2 pixels to perform the resolution conversion, and allots the decoded data of 8 bits to the aij of 2×2 pixels (step P622). That is to say, the entire decoded data value of aij of 2×2 pixels has the same value.

FIG. 11 shows the relationship between the quantized data BTC(bij) and the decoded data in the first decoding processing, and the relationship is described by the following formulae.

When BTC(bij)=11 is satisfied, aij=Max
When BTC(bij)=10 is satisfied, aij=min+(Max−min)×2/3
When BTC(bij)=01 is satisfied, aij=min+(Max−min)×1/3
When BTC(bij)=00 is satisfied, aij=min When the decoded data is obtained, the processing is moved on to step P7 shown in FIG. 15. The processing performed after step P7 is the same as described above, thus the description thereof is omitted.

Subsequently, the second decoding processing is described with reference to FIG. 20. In the second decoding processing, the quantized data BTC(bij) is decoded by the decoding method corresponding to the quantization method used in the second quantization processing.

In the second quantization processing, the data value (00-11) of BTC(bij) is allotted according to the sorting of the group of the density pattern in which 2 values of 1 and 0 are disposed. Thus, when this is decoded to data of original 8 bits, there may be several density patterns according to the data value of BTC(bij) as shown in FIG. 21. Accordingly, in the second decoding processing, the decoding is performed by predicting which density pattern the one at the time of the quantization had from the data value of BTC(bij).

Figure 20:
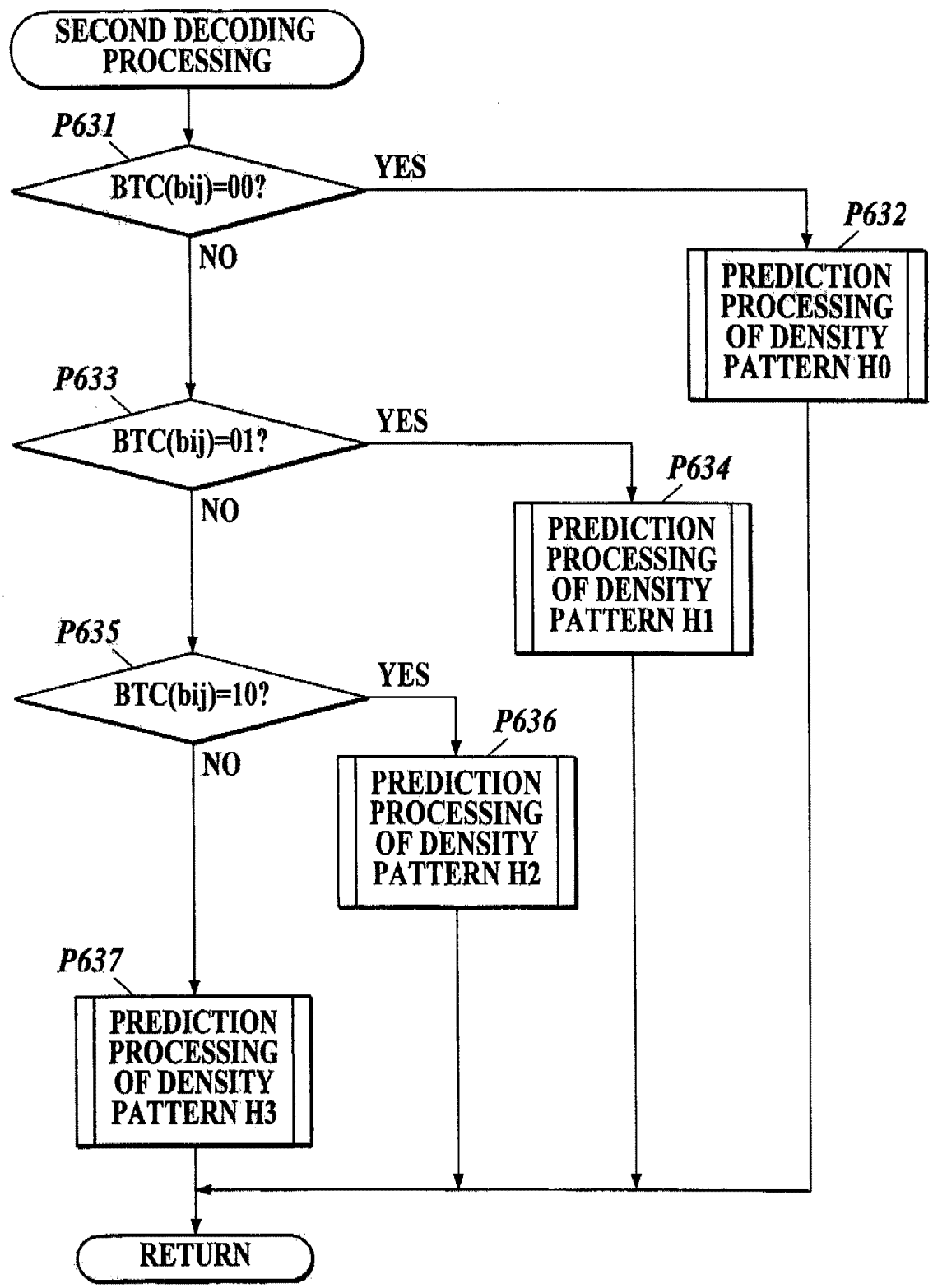
FIG. 20 is a flow chart showing second decoding processing.

As shown in FIG. 20, the image extension conversion unit 2 judges the data value of BTC(bij). When BTC(bij)=00 is satisfied (step P631; Y), the image extension conversion unit 2 moves on to the predicting processing of density pattern H0 (step P632). Further, when BTC(bij)=01 is satisfied (step P631; N, step P633; Y), the image extension conversion unit 2 moves on to the predicting processing of density pattern H1 (step P634). Further, when BTC(bij)=10 is satisfied (step P631; N step P633; N, step P635; Y), the image extension conversion unit 2 moves on to the predicting processing of density pattern H2 (step P636). Further, when BTC(bij)=11 is satisfied (step P631; N step P633; N, step P635; N), the image extension conversion unit 2 moves on to the predicting processing of density pattern H3 (step P637).

The predicting processing of the density patterns H0-H3 are the same in the processing content only different in the templates to be used therein. Here, the predicting processing of the density pattern H0 is described as a representative with reference to FIG. 22.

In the predicting processing of the density patterns H0-H3, templates are used for the prediction of the density patterns of H0-H3.

FIG. 23 shows the case in which BTC(bij)=00 is satisfied, that is to say, the relationship between the template used in the predicting processing of the density pattern H0, and the density pattern to be predicted when the density pattern matches the template. Each template is given an identification number (which is the number indicated at the upper left of each template).

"C" given on each template is one of the matching conditions of the template. "C" shows that, when the attribute data of the pixel located at the position of "C" is of a photographic image, one of the matching conditions is to satisfy $|C_{den}-\text{bij}_{Max}| \leq T_c$ wherein $|C_{den}-\text{bij}_{Max}|$ represents the density difference between the pixel located at the position of "C" and the attention pixel bij. Here, $C_{den}$ represents the decoded data value of the pixel located at the position of "C". That is to say, the pixel of "C" is performed with BTC compression processing, thus $C_{den}$ represents the decoded data value (the decoded data value shown in FIG. 6) by the BTC extension processing. On the other hand, when the attribute data of the pixel located at the position of "C" is of other than a photographic image, "C" shows that, one of the matching conditions is that the pixel located at "C" satisfies the conditions (11)-(14), and further, $|C_{den}-\text{bij}_{Max}| < T_c$ is satisfied wherein $|C_{den}-\text{bij}_{Max}|$ represents the density difference between the pixel located at the position of "C" and the attention pixel bij. That is to say, the pixel of "C" is performed with the first quantization processing, thus $C_{den}$ represents the decoded data value (the decoded data value shown in FIG. 11) by the first decoding processing. The $bij_{Max}$ is the maximum density value Max in the processing region of 4×4 pixels to which the attention pixel bij belongs.

Further, "M" given on each template is one of the matching conditions of the template. "M" shows that, the attribute data of the pixel located at the position of "M" is of other than a photographic image, and that one of the matching conditions is that the pixel located at "M" satisfies the condition (2), and further, $|M_{Max} - bij_{max}| < T_M$ is satisfied wherein $|M_{Max} - bij_{Max}|$ represents the density difference between the pixel located at the position of "M" and the attention pixel bij. The $M_{Max}$ is the maximum density value Max in the processing region of 4×4 pixels to which the pixel of "M" belongs. When the pixel of "M" and the attention pixel bij belong to the same processing region, $M_{Max} = bij_{Max} = Max$ is satisfied, thus the density difference is to be 0.

Incidentally, $T_C$, $T_M$ are threshold values to judge whether the density difference is small or not, and may be suitably set, such as $T_C = 30$, $T_M = 35$, and the like. As described above, $T_C$, $T_M$ may be set to be different values, or to be the same values. By comparing $T_C$, $T_M$, the density pattern in which the density difference is small, that is to say, the density of the pixel located at the position of "C" or "M" and that of the attention pixel bij are approximately the same, is predicted.

Figure 24:
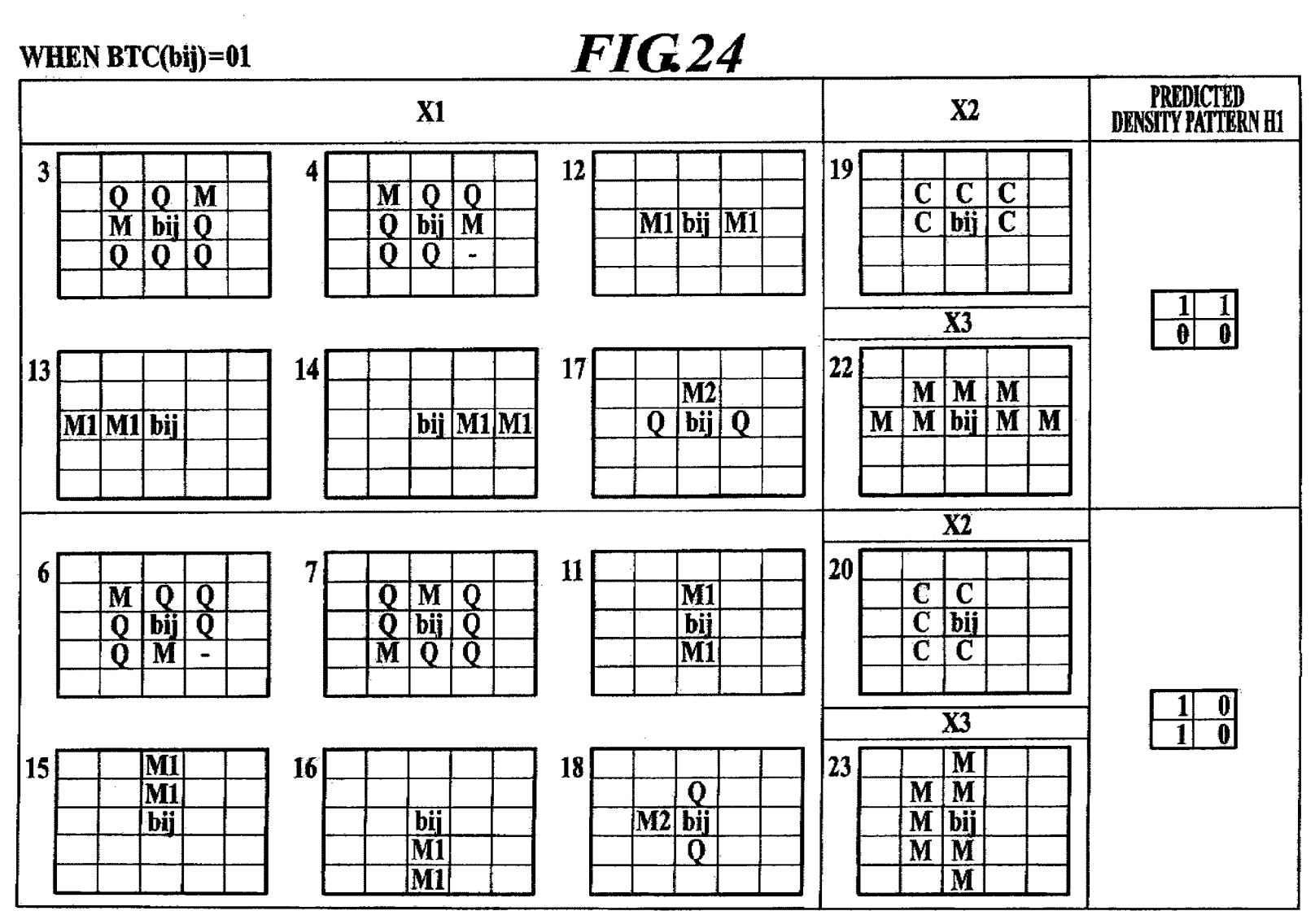
Figure 27:
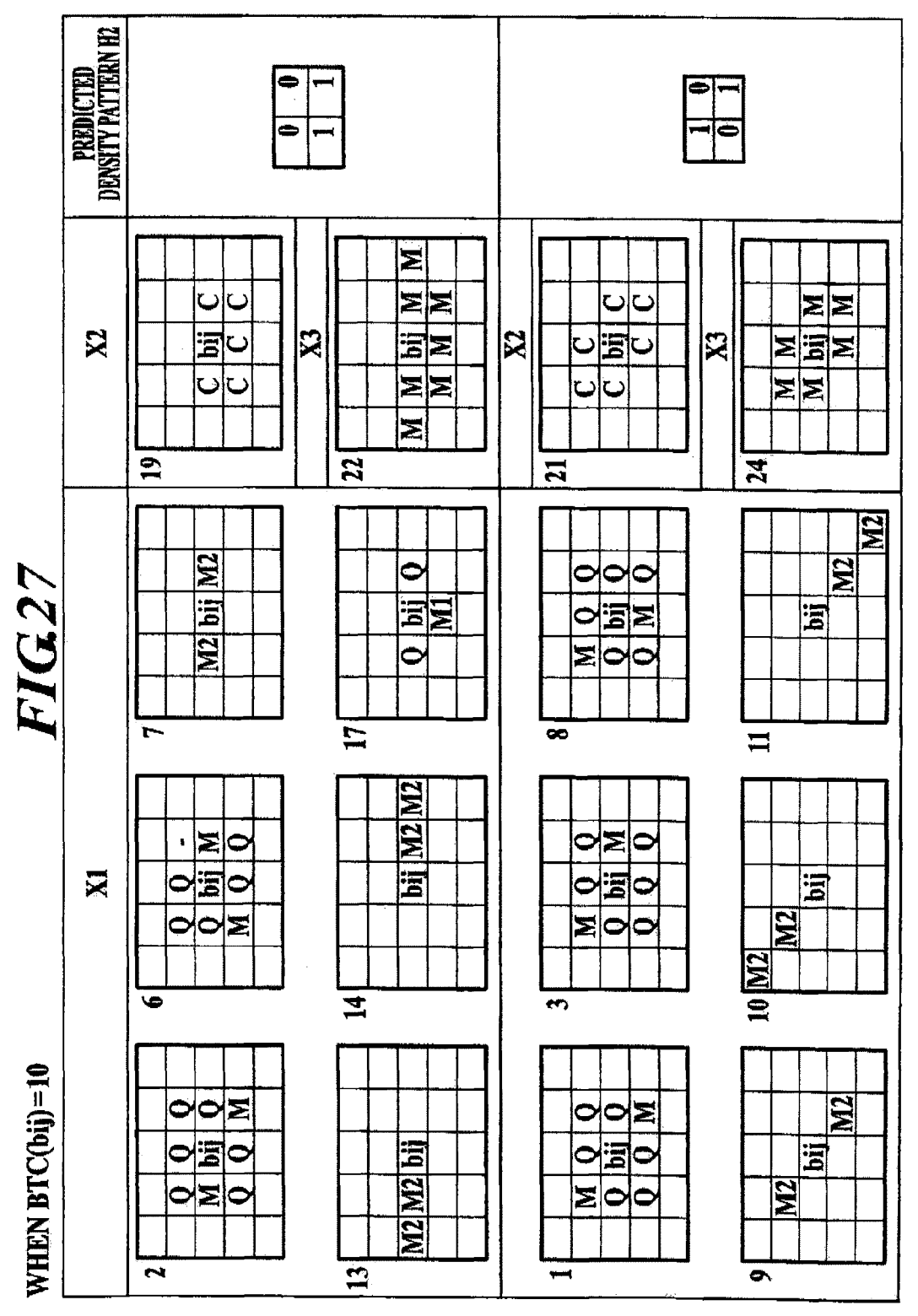

FIGS. 24 and 25 show the case in which BTC(bij)=01 is satisfied, that is to say, the relationship between the template used in the predicting processing of the density pattern H1, and the density pattern to be predicted when the density pattern matches the template. FIGS. 26 and 27 show the case in which BTC(bij)=10 is satisfied, that is to say, the relationship between the template used in the predicting processing of the density pattern H2, and the density pattern to be predicted when the density pattern matches the template. FIG. 28 shows the case in which BTC(bij)=11 is satisfied, that is to say, the relationship between the template used in the predicting processing of the density pattern H3, and the density pattern to be predicted when the density pattern matches the template.

In FIGS. 24-28, M1, M2, Q are the matching conditions of the templates. M1 shows that the pixel located at the position of M1 satisfies the above condition of "M", and that one of the matching conditions is to satisfy the density pattern H1. That is to say, the condition is that the attribute data of the pixel of M1 is of other than a photographic image, and that the pixel of M1 satisfies BTC(bij)=01. M2 shows that the pixel located at the position of M2 satisfies the above condition of "M", and that one of the matching conditions is to satisfy the density pattern H2. That is to say, the condition is that the attribute data of the pixel of M2 is of other than a photographic image, and that the pixel of M2 satisfies BTC(bij)=10.

"Q" shows that one of the matching conditions is that the pixel located at the position of "Q" does not satisfy any of the conditions of "C", "M", M1 and M2.

Each template is sorted into 3 groups of X1, X2 and X3. This is because the prediction is performed in 3 stages.

The density pattern is judged to be matched with the template of X1 group, when the entire conditions such as "C", "M", and the like, determined in the template are satisfied. On the other hand, the density pattern is judged to be matched with the template of X2 or X3 group, when not the entire conditions such as "C", "M", and the like, are satisfied, and in the case where a certain evaluation is obtained when the evaluation of how much those conditions are satisfied is performed. For example, in the case of the template of X2 group, the matching is performed for the entire template groups in the X2 group, the number of pixels which satisfy the conditions of "C", "M", and the like, is calculated so as to be the evaluation value. Further, the density pattern is judged to match with the template in which the obtained evaluation value is to be the maximum.

These templates are designed to predict the density pattern of the attention pixel bij from the shape of the edge, a thin line structure, and the like, included in the original image. The structure in which maintenance of high resolution is desired, such as the edge shape, the thin structure, and the like, can be specified from the density pattern of the surrounding pixels of the attention pixel bij. Thus the template defines the condition of the surrounding pixels in such structure as the conditions such as "C" and "M", and the like.

Particularly, the X1 group contains template groups designed to be able to predict the density pattern when the attention pixel bij is the pixel of the thin line structure in which the maintenance of high resolution is especially desired. On the other hand, X2 and X3 groups contain template groups in which looser matching conditions than X1 group is set so as to be able to broadly predict density patterns when edge shapes, and the like, are formed.

Figure 29A:
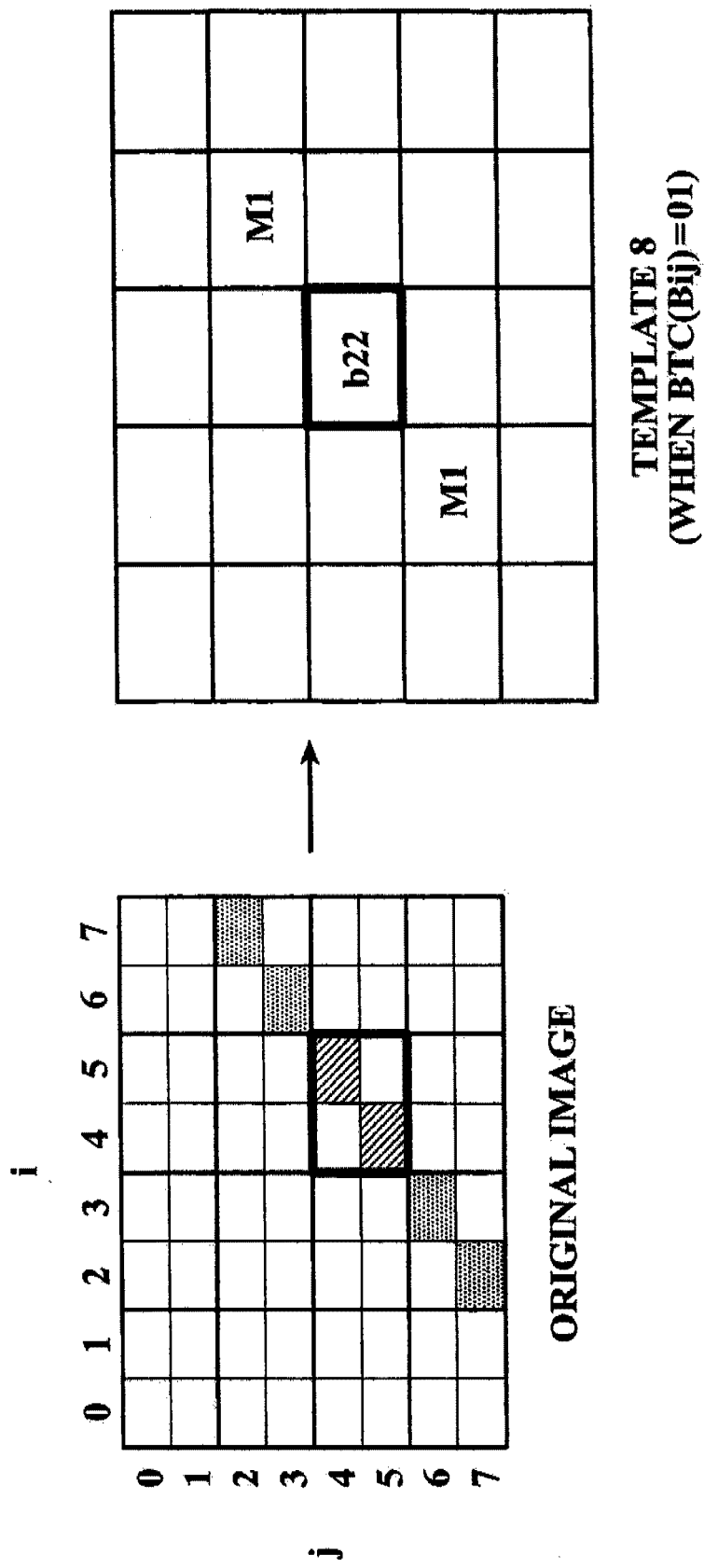
FIG. 29A is a diagram showing the original image and a template used for the prediction.

For example, as shown in FIG. 29A, when an image of an oblique line with 1 dot width is included in the original image of a00-a77, condition (2) is satisfied by 4 pixels of a44, a45, a54, a55 in the standard degeneracy compression processing, and thus the density pattern H1 is satisfied. Thus, the pixel b22 of the processing image corresponding to these 4 pixels are quantized to BTC(b22)=01. Then, at the time of decoding, from the density pattern of surrounding pixels b13, b31 (which are located at the upper right and lower left of the attention pixel b22), dots of the pixel of b22 are disposed in a state of 1 dot width and being connected to the dots formed by the pixels b13, b31. Thus, the density of these dots can be predicted to be approximately the same. Accordingly, in order to predict these density patterns, template 8 (see FIG. 25) in which the condition of M1 is determined in the surrounding pixels is designed as shown in FIG. 29A.

Further, as shown in FIG. 29B, when the original image contains an edge of an image having a certain density, a44, a45, a54, a55 configuring the edge portion is of the density pattern H1. The density pattern of the edge shape is predicted at the time of the decoding, thus template 20 (see FIG. 24) is designed in which the condition of "C" is determined in the surrounding pixels of the pixel b22 of the processing image corresponding to a44, a45, a54, a55, as shown in FIG. 29B. The template 20 is the template of X2 group. In the original image, (a24, a25, a34, a35) which correspond to the pixel straight above the attention pixel b22 satisfy the condition (2). Thus, the condition of "C" is not satisfied at straight above the b22 in the template 20, however, (a22, a32, a23, a33), (a24, a34, a25, a35), (a26, a36, a27, a37) which correspond to 3 pixels placed at left side of b22 are to satisfy the condition of "C". The evaluation value is higher, thus the possibility that the density pattern is to be judged to match the template 20 should be larger.

Incidentally, the weighting evaluation is performed, thus a weighting coefficient may be set in the templates in X2, X3 groups. For example, in the case of the original image shown in FIG. 29B, when the entire 3 pixels located in the left side of the attention pixel b22 satisfies the condition of "C", the possibility that the attention pixel b22 has a density pattern in which 2 pixels on the left side in the 2×2 pixels have the value of 1, is high. Accordingly, the matching condition "C" set for the 3 pixels located in the left side of the attention pixel b22 in the template 20, may be set with the weighting coefficient of for example, 2, and the like. And when the condition "C" is satisfied at these 3 pixel positions, the evaluation value may be obtained by multiplying the weighting coefficient therewith. Thereby, the rate of matching with the template can be adjusted.

The templates shown in FIGS. 23-28 are examples. Templates may be suitably designed according to the edge shape, and the like, included in the original image.

The predicting processing using the above described templates is described with reference to FIG. 22.

Figure 22:
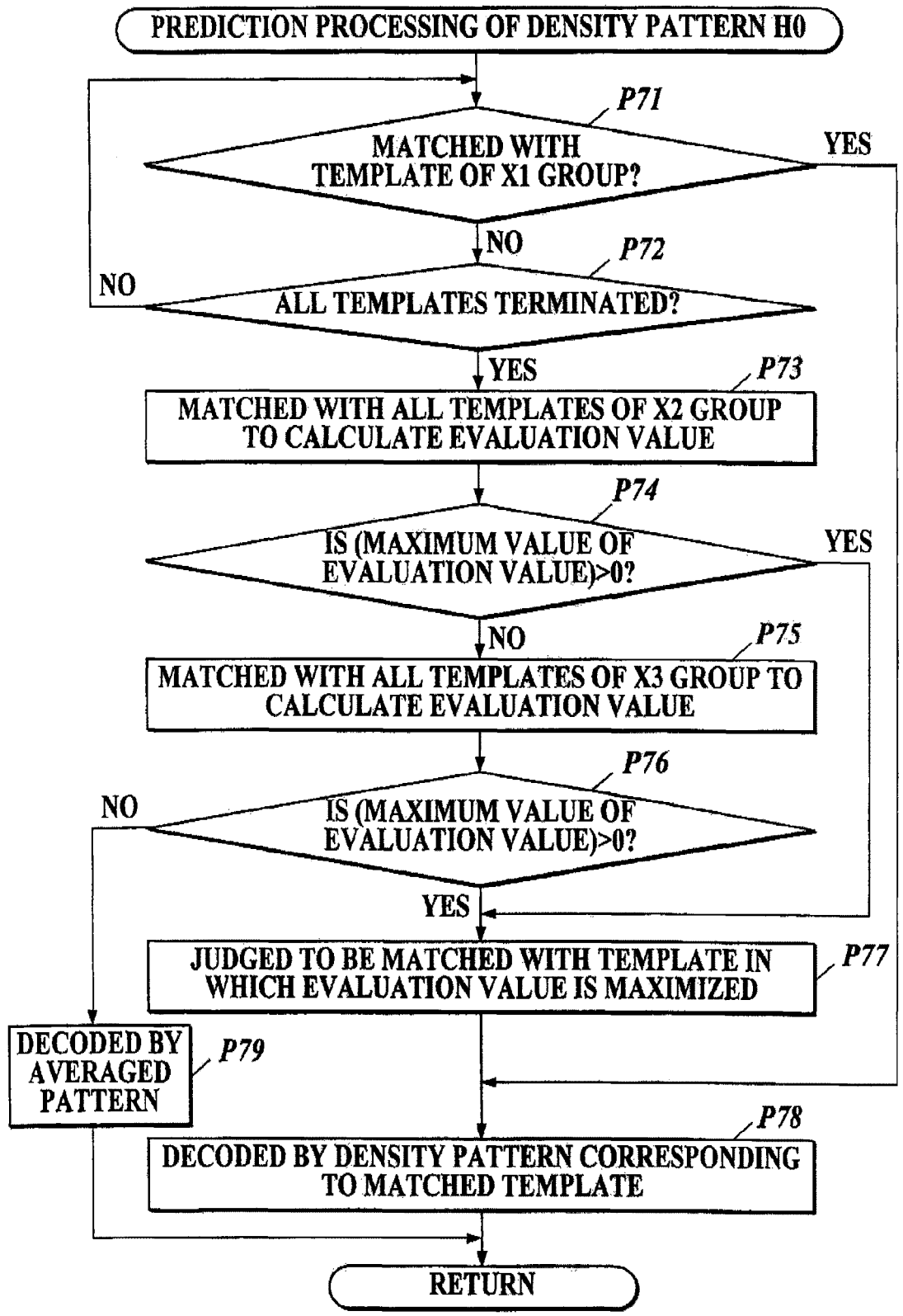
FIG. 22 is a flow chart showing prediction processing of a density pattern H0.

As shown in FIG. 22, the image extension conversion unit 2 matches the density pattern with one of the templates of X1 group so that the attention pixel bij and the center position of the template are to be matched. When it is judged that the template matches (step P71; Y), the image extension conversion unit 2 predicts the density pattern by the matched template. Then, the image extension conversion unit 2 performs the decoding of the attention pixel bij according to the predicted density pattern (step P78).

The image extension conversion unit 2 replaces the value 1 with Max, and the value 0 to min in the predicted density pattern to perform the decoding. That is to say, the image extension conversion unit 2 allots decoded data value Max, min corresponding to the 2 values set for the predicted density pattern to aij of 2×2 pixels in which the attention pixel bij is performed with the resolution conversion. Thus, the resolution conversion is also performed at the time of the decoding. When the density pattern is patterned in the second quantization processing, the pixel approximate to Max is set to be 1, and the pixel approximate to min is set to be 0 in the binarization. Thus, even when pixel aij set with value 1 is replaced with Max, and pixel aij set with value 0 is replaced with min in the 2×2 pixels, the error of density between the original image and the uncompressed image is to be small.

For example, when the attention pixel bij is BTC(bij)=00, and the matched template is template 1 (see FIG. 23), the density pattern in which the pixel located at upper left is 1 and the others are 0 as shown in FIG. 21 is predicted. In this density pattern, aij of 2×2 pixels in which value 1 is replaced with Max(8 bits) and value 0 is replaced with min(8 bits) is to be the decoded image (1200 dpi, 8 bits).

When it is judged that the template does not match (step P71; N), the image extension conversion unit 2 judges whether the matching with the entire templates in X1 groups has been terminated or not (step P72). When not the entire matching has been terminated (step P72; N), the image extension conversion unit 2 returns to the processing in step P71, and repeats the matching with other templates which belong to the X1 group until it is matched to any one of the template in the X1 group.

When neither of the templates matched although the matching with the entire templates in the X1 group has been performed (step P72; Y), the image extension conversion unit 2 performs the matching with the entire templates which belong to X2 group, thus calculates the evaluation value for each of the templates (step P73). Subsequently, when the maximum value among the evaluation values calculated for each template is more than 0 (step P74; Y), the image extension conversion unit 2 judges that it is matched with the template in which the evaluation value is to be the maximum (step P77). The image extension conversion unit 2 predicts the density pattern according to the template which is judged to be matched, and performs the decoding of the attention pixel bij according to the predicted density pattern (step P78).

On the other hand, when none of the conditions determined for the templates in X2 group is satisfied, and the maximum value among the evaluation values calculated for each template is 0 (step P74; N), the image extension conversion unit 2 performs the matching with the entire templates which belong to X3 group, thus calculates the evaluation value for each of the templates (step P75). Subsequently, when the maximum value among the evaluation values calculated for each template is more than 0 (step P76; Y), the image extension conversion unit 2 judges that it is matched with the template in which the evaluation value is to be the maximum (step P77). The image extension conversion unit 2 predicts the density pattern according to the template which is judged to be matched, and performs the decoding of the attention pixel bij according to the predicted density pattern (step P78).

When none of the conditions determined for the templates in X3 group is satisfied, and the maximum value among the evaluation values calculated for each template is 0 (step P76; N), it can be conceived that the pixel which is set with the value 1 forms an image of an isolated point in aij of 2×2 pixels. In this case, it is difficult to predict the density pattern by referring to the surrounding pixels, thus the image extension conversion unit 2 performs the decoding by using the averaged pattern (step P79).

In the averaged pattern, an averaged value is allotted to each of aij of 2×2 pixels as shown in FIG. 21. The averaged pattern is determined for each density pattern H0-H3. For example, in the case of density pattern H0, there is 1 pixel which is set with the value 1 in aij of 2×2 pixels, thus the density value of Max is output for 4 pixels. Accordingly, in the averaged pattern corresponding to the density pattern H0, the averaged value ¼Max is allotted to each pixel aij of 2×2 pixels. In the same manner, the density of 2Max is output for 4 pixels in the density patterns H1, H2, and the density of 3Max is output for 4 pixels in the density pattern H3. Thus the average pattern in which their average values of ½Max, ¾Max are allotted respectively to each pixel of 2×2 pixels is determined.

As described above, when decoded aij of 2×2 pixels is obtained, the processing is moved on to step P7 shown in FIG. 15. The processing performed after step S7 is the same as described above, thus the description thereof is omitted.

FIGS. 30 and 31 show the examples where the quantization and the decoding are performed by the degeneracy compression processing.

FIG. 30 shows the embodiment 1 where the compression and the extension are performed by the standard degeneracy conversion, and the comparative examples 1-3 for the image containing: an image of a text of "可逆 (meaning reversible)" (black 100%); an image of an oblique line 1 (black 100%, a thin line of 1 dot width); and an image of an oblique line 2 (thick line; magenta 100%, 6 dot width, thin line; magenta 30%, 2 dot width).

FIG. 31 shows comparative examples 1-3, and the embodiment 1 where the compression by the standard degeneracy conversion is applied, for the image containing: an image of a text of "g." (4 colors of CMYK); an image of a facial photograph 1 (yellow) of a human; and an image of a facial photograph 2 (4 colors of CMYK).

The image processing method in the comparative examples 1-3 and in the embodiment 1 is performed as follows.

Comparative Example 1

An image which is rasterized by 600 dpi, 8 bits is made to be 1200 dpi by copying the data value of 1 pixel of 600 dpi to 4 pixels of 1200 dpi.

Comparative Example 2

An image which is rasterized by 1200 dpi, 8 bits is averaged so as to perform the resolution conversion to 600 dpi (the averaged value of the data value of 4 pixels of 1200 dpi is allotted to 1 pixel of 600 dpi), and further is performed with the resolution conversion to the original 1200 dpi (simply dividing the pixel to 4, and the same value is allotted thereto).

Comparative Example 3

An image is rasterized by 1200 dpi, 8 bits. The image quality of the image in this comparative example 3 is the image quality of the target.

Embodiment 1

An image which is rasterized by 1200 dpi, 8 bits is performed with the compression to 600 dpi, 4 bits by the above mentioned compression method of the standard degeneracy conversion, and with the resolution conversion, then is performed with the extension to 1200 dpi, 8 bits by the above mentioned extension method according to the present embodiment, and with the resolution conversion.

Incidentally, what is shown on the right of the Embodiment 1 in FIGS. 30 and 31, are examples which is patterned by adding different designs for the halftone region and for the high resolution region, in order to make the image portion which is judged to be the halftone region and the high resolution region easy to be noticed.

As can be noticed from FIGS. 30 and 31, in the method of the comparative example 2 where the resolution conversion is simply performed, data is to be lost while the processing of the compression and the resolution conversion. Thus, the reproduction of edge portions in the texts and graphics is reduced, thus lacking in the sharpness of the edges. As a result, the texts have a rough image which is blurry as a whole.

On the other hand, the Embodiment is successful in almost accurately reproducing the thin lines in the comparative example 3 where the rasterizing of 1200 dpi, 8 bits is performed, even for the thin line of 1 dot width, although there is a slight lack of reproduction is the details. Further, the reproduction in the edge portion is also fine, and the sharpness of the texts and graphic is almost the same as that of the comparative example 3.

As described above, according to the present embodiment, in order to quantize the image having the attribute for each pixel, the image compression conversion unit 1 performs BTC compression processing for the region of 2×2 pixels having the attribute data of a photographic image, and performs the degeneracy compression processing for the region of 2×2 pixels having the attribute data of a text or a graphic, other than a photographic image.

Further, the image extension conversion unit 2 performs BTC extension processing for pixel bij having the attribute data of a photographic image, among the quantized processing image, and performs degeneracy extension processing for pixel bij having the attribute data of a text or a graphic, other than a photographic image.

The quantization is performed by BTC method in the BTC compression processing, and the decoding is performed by BTC method in the BTC extension processing. Thus, even when the compression processing and the extension processing are performed, the gradation can be maintained for the region having the attribute of the photographic image.

Further, in the degeneracy compression processing, the image compression conversion unit 1 quantizes the average value avr(bij) of each pixel of 2×2 pixel by BTC method, in a state where the region of 2×2 pixels which satisfies the conditions (11)-(14) is considered to be the halftone region. Further, the image compression conversion unit 1 produces the density pattern in which pixel value of each pixel aij of a region is binarized, so as to be quantized to the quantized data previously determined for the density pattern, in a state where the region of 2×2 pixels which satisfies the condition (2) is considered to be the high resolution region.

In the degeneracy processing, image extension conversion unit 2 decodes the pixel bij which is considered to be the halftone region by the BTC method, at the time of the quantization. Further, the image extension conversion unit 2 predicts the density pattern produced at the quantization by using the templates, from the data value of the quantized data BTC (bij) of the pixel bij which is considered to be the high resolution region, thus obtains the decoded data Max, min corresponding to each pixel determined for the predicted density pattern.

Thereby, even the compression processing and the extension processing are performed, the gradation can be maintained in the halftone region, and the resolution can be maintained in the high resolution region. Accordingly, even in a case where the region having the attribute emphasizing the gradation and the region having the attribute emphasizing the resolution are mixed in 1 image, the compression processing and the extension processing can be performed according to the attributes.

Further, in the degeneracy compression processing, the identification data flag(bij) in which flag(bij)=0 is for the halftone region, and flag(bij)=1 is for the high resolution region, is retained in the memory corresponding to the quantized data BTC(bij) of the processing image. Accordingly, the image extension conversion unit 2 can easily identify whether the pixel bij to be decoded is quantized either as the halftone region or as the high resolution region by the identification data flag(bij), thus perform the above described degeneracy extension processing.

Further, the image compression conversion unit 1 performs the resolution conversion from aij (1200 dpi) of 2×2 pixels to 1 pixel bij (600 dpi). Thus, 4 pieces of attribute data which is comprised by each aij configuring the region of 2×2 pixels which is to be the object of the quantization is converted to 1 piece of attribute data. When the attribute data of a text is included in the 4 pieces of attribute data, the image compression conversion unit 1 sets 1 piece of attribute data to be converted to the attribute data of a text. When the attribute data of a text is not included, but the attribute data of a graphic is included, the image compression conversion unit 1 sets 1 piece of attribute data to be converted to the attribute data of a graphic. In this manner, the converted attribute data is determined as the attribute data of a text or that of a graphic on a priority basis, thereby the image quality deterioration of a text or a graphic due to the BTC compression processing or the degeneracy compression processing can be prevented.

Incidentally, the above described embodiment is a preferred example of the present invention, and is not limited to this.

For example, at the time of decoding in the above described embodiment, the resolution conversion is performed for the entire image region to bring back to the resolution before quantization. However, the region for which the BTC compression processing has been performed or the region which satisfies the conditions (11)-(14) (which is the halftone region in which the first quantization processing has been performed) may not be performed with the resolution conversion and be subjected to only decoding.

Further, the present invention may be applied to a computer apparatus to perform image processing other than the MFP. Further, the above described compression processing and the extension processing may be made into programs, and the image processing may be performed by software using the programs. In this case, as the computer-readable medium of the program, ROM, a nonvolatile memory such as a flash memory, and the like, and a portable recording media, such as a compact disc read only memory (CD-ROM), and the like, can be applied. Moreover, as a medium to provide the data of the program through a communication line, a carrier wave may also be applied.

(1) According to a first aspect of the embodiment of the present invention, there is provided an image processing apparatus comprising an image compression conversion unit to quantize an image having attribute data for each pixel, wherein when a region has the attribute data of a photographic image, the image compression conversion unit quantizes the region by a BTC method, wherein when a region has the attribute data of other than the photographic image, and the region is a halftone region, the image compression conversion unit quantizes the region by the BTC method, and wherein when a region has the attribute data of other than the photographic image, and the region is a high resolution region, the image compression conversion unit generates a density pattern for the region to quantize the region according to the generated density pattern.

(2) In the above image processing apparatus, preferably, when the region has the attribute data of other than the photographic image, the image compression conversion unit retains identification data which indicates whether the region is the halftone region or the high resolution region, in a memory region corresponding to the quantized image.

(3) In the above image processing apparatus, preferably, the image compression conversion unit averages a pixel value of a plurality of pixels which configure the region having the attribute data of the photographic image, and quantizes the obtained average value by the BTC method, to perform a resolution conversion so that a resolution of the region having the attribute data of the photographic image is reduced compared to the resolution before the quantizing.

(4) In the above image processing apparatus, preferably, when the region having the attribute data of other than the photographic image is the halftone region, the image compression conversion unit averages a pixel value of a plurality of pixels which configure the halftone region, and quantizes the obtained average value by the BTC method, to perform a resolution conversion so that a resolution of the halftone region is reduced compared to the resolution before the quantizing.

(5) In the above image processing apparatus, preferably, when the region having the attribute data of other than the photographic image is the high resolution region, the image compression conversion unit generates the density pattern in which a pixel value of a plurality of pixels which configure the high resolution region is binarized, and obtains quantized data which is previously determined for the generated density pattern, to perform a resolution conversion so that a resolution of the high resolution region is reduced compared to the resolution before the quantizing.

(6) In the above image processing apparatus, preferably, the image compression conversion unit converts each piece of attribute data comprised by the plurality of pixels which configure the region being an object of the quantizing to 1 piece of attribute data, to quantize the region based on the converted piece of attribute data.

(7) In the above image processing apparatus, preferably, when the attribute data comprised by each pixel which configures the region being the object of the quantizing comprises the attribute data of a text, the image compression conversion unit sets the 1 piece of attribute data to be converted as the attribute data of the text, wherein when the attribute data does not comprise the attribute data of the text but comprises the attribute data of a graphic, the image compression conversion unit sets the 1 piece of attribute data to be converted as the attribute data of the graphic.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the compression processing can be performed according to the attributes of the region.

According to a second aspect of the embodiment of the present invention, there is provided an image processing apparatus, comprising an image extension conversion unit to decode the image quantized by the image processing apparatus of above described (1), wherein when the region has the attribute data of the photographic image, the image extension conversion unit decodes the region by the BTC method, wherein when the region has the attribute data of other than the photographic image, and the region is the halftone region, the image extension conversion unit decodes the region by the BTC method, and wherein when the region has the attribute data of other than the photographic image, and the region is the high resolution region, the image extension conversion unit predicts the density pattern generated for the region at the quantizing to decode the region according to the predicted density pattern.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

According to a third aspect of the embodiment of the present invention, there is provided an image processing apparatus, comprising an image extension conversion unit to decode the image quantized by the image processing apparatus of above described (2), wherein when the region has the attribute data of the photographic image, the image extension conversion unit decodes the region by the BTC method, wherein when the region has the attribute data of other than the photographic image, the image extension conversion unit identifies whether the region is the halftone region or the high resolution region, by the identification data retained in the memory region corresponding to the quantized image, wherein when the region is the halftone region, the image extension conversion unit decodes the region by the BTC method, and wherein when the region is the high resolution region, the image extension conversion unit predicts the density pattern generated for the region at the quantizing to decode the region according to the predicted density pattern.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

According to a fourth aspect of the embodiment of the present invention, there is provided an image processing apparatus, comprising an image extension conversion unit to decode the image quantized by the image processing apparatus of above described (3), wherein the image extension conversion unit decodes the region among the quantized image, having the attribute data of the photographic image, by the BTC method, wherein the image extension conversion unit performs the resolution conversion so that the resolution of the region is returned to the resolution before the quantizing, to allot the decoded data to each pixel having been performed with the resolution conversion.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

According to a fifth aspect of the embodiment of the present invention, there is provided an image processing apparatus, comprising an image extension conversion unit to decode the image quantized by the image processing apparatus of above described (4), wherein the image extension conversion unit decodes the halftone region among the quantized image, having the attribute data of other than the photographic image, by the BTC method, wherein the image extension conversion unit performs the resolution conversion so that the resolution of the halftone region is returned to the resolution before the quantizing, to allot the decoded data to each pixel having been performed with the resolution conversion.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

According to a sixth aspect of the embodiment of the present invention, there is provided an image processing apparatus, comprising an image extension conversion unit to decode the image quantized by the image processing apparatus of above described (5), wherein the image extension conversion unit predicts the density pattern generated in the resolution before the quantizing for the high resolution region among the quantized image, having the attribute data of other than the photographic image, to obtain decoded data corresponding to the plurality of pixels determined for the predicted density pattern.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

According to a seventh aspect of the embodiment of the present invention, there is provided a compression method to quantize an image having attribute data for each pixel, comprising:

when a region has the attribute data of a photographic image, quantizing the region by a BTC method;

when a region has the attribute data of other than the photographic image, and the region is a halftone region, quantizing the region by the BTC method; and when a region has the attribute data of other than the photographic image, and the region is a high resolution region, generating a density pattern for the region to quantize the region according to the generated density pattern.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the compression processing can be performed according to the attributes of the region.

According to a eighth aspect of the embodiment of the present invention, there is provided an extension method to decode the image quantized by the above described compression method, comprising:

when the region has the attribute data of the photographic image, decoding the region by the BTC method;

when the region has the attribute data of other than the photographic image, and the region is the halftone region, decoding the region by the BTC method; and when the region has the attribute data of other than the photographic image, and the region is the high resolution region, predicting the density pattern generated for the region to decode the region according to the predicted density pattern.

According to the present invention, the gradation can be maintained for the region having the attribute of a photographic image. Further, the region having the attributes of a text or a graphic other than a photographic image is separated into the halftone region and the high resolution region. Thereby, the gradation can be maintained for the halftone region and the resolution can be maintained for the high resolution region. Accordingly, even in a case where the region emphasizing the gradation and the region emphasizing the resolution are mixed in 1 image, the extension processing can be performed according to the attributes of the region.

The present U.S. patent application claims a priority under the Paris Convention of Japanese patent application No. 2008-256259 filed on Oct. 1, 2008, which shall be a basis of correction of an incorrect translation.

What is claimed is:

1. An image processing apparatus comprising:
   an image compression conversion unit to quantize an image having attribute data for each pixel; and
   a memory to save the image quantized by the image compression conversion unit, wherein
   when a region of the image has the attribute data of a photographic image, the image compression conversion unit quantizes the region by a BTC method, and saves a quantized image in the memory, wherein
   when a region of the image having the attribute data of other than the photographic image is a halftone region, the image compression conversion unit quantizes the region by the BTC method, and saves the quantized image in the memory, and wherein
   when the region of the image having the attribute data of other than the photographic image is a high resolution region, the image compression conversion unit generates a density pattern for the region, quantizes the region according to the generated density pattern, and saves the quantized image in the memory.

2. The image processing apparatus of claim 1, wherein the image compression conversion unit retains identification data which indicates whether the region having the attribute data of other than the photographic image is the halftone region or the high resolution region, in a memory region corresponding to the quantized image.

3. The image processing apparatus of claim 1, wherein the image compression conversion unit averages a pixel value of a plurality of pixels which configure the region having the attribute data of the photographic image, and quantizes the obtained average value by the BTC method, to perform a resolution conversion so that a resolution of the region having the attribute data of the photographic image is reduced compared to the resolution before the quantizing.

4. The image processing apparatus of claim 1, wherein when the region having the attribute data of other than the photographic image is the halftone region, the image compression conversion unit averages a pixel value of a plurality of pixels which configure the halftone region, and quantizes the obtained average value by the BTC method, to perform a resolution conversion so that a resolution of the halftone region is reduced compared to the resolution before the quantizing.

5. The image processing apparatus of claim 1, wherein when the region of the image having the attribute data of other than the photographic image is the high resolution region, the image compression conversion unit generates the density pattern in which a pixel value of a plurality of pixels which configure the high resolution region is binarized, and quantizes the image according to the density pattern, to perform a resolution conversion so that a resolution of the high resolution region is reduced compared to the resolution before the quantizing.

6. The image processing apparatus of claim 3, wherein the image compression conversion unit converts each piece of attribute data comprised by the plurality of pixels which configure the region being an object of the quantizing to 1 piece of attribute data, to quantize the region based on the converted piece of attribute data.

7. The image processing apparatus of claim 6, wherein when the attribute data comprised by each pixel which configures the region being the object of the quantizing comprises the attribute data of a text, the image compression conversion unit sets the 1 piece of attribute data to be converted as the attribute data of the text, wherein
   when the attribute data does not comprise the attribute data of the text but comprises the attribute data of a graphic, the image compression conversion unit sets the 1 piece of attribute data to be converted as the attribute data of the graphic.

8. The image processing apparatus of claim 1, further comprising an image extension conversion unit to decode the image saved in the memory, wherein
   when the region of the image has the attribute data of the photographic image, the image extension conversion unit decodes the region by the BTC method, wherein
   when the region of the image having the attribute data of other than the photographic image is the halftone region, the image extension conversion unit decodes the region by the BTC method, and wherein
   when the region of the image having the attribute data of other than the photographic image is the high resolution region, the image extension conversion unit predicts the density pattern of the region, and the image extension conversion unit decodes the region according to a predicted density pattern.

9. The image processing apparatus of claim 2, further comprising an image extension conversion unit to decode the image saved in the memory, wherein
   when the region of the image has the attribute data of the photographic image, the image extension conversion unit decodes the region by the BTC method, wherein
   the image extension conversion unit identifies whether the region having the attribute data of other than the photographic image is the halftone region or the high resolution region, by the identification data retained in the memory region, wherein
   when the region having the attribute data of other than the photographic image is the halftone region, the image extension conversion unit decodes the region by the BTC method, and wherein
   when the region having the attribute data of other than the photographic image is the high resolution region, the image extension conversion unit predicts the density pattern of the region, and the image extension conversion unit decodes the region according to a predicted density pattern.

10. The image processing apparatus of claim 3, further comprising an image extension conversion unit to decode the image saved in the memory, wherein
    the image extension conversion unit decodes the region among the quantized image, having the attribute data of the photographic image, by the BTC method, wherein
    the image extension conversion unit performs the resolution conversion so that the resolution of the region is returned to the resolution before the quantizing, to allot the decoded data to each pixel having been performed with the resolution conversion.

11. The image processing apparatus of claim 4, further comprising an image extension conversion unit to decode the image saved in the memory, wherein
    the image extension conversion unit decodes the halftone region among the quantized image, having the attribute data of other than the photographic image, by the BTC method, wherein
    the image extension conversion unit performs the resolution conversion so that the resolution of the halftone region is returned to the resolution before the quantizing, to allot the decoded data to each pixel having been performed with the resolution conversion.

12. The image processing apparatus of claim 5, further comprising an image extension conversion unit to decode the image saved in the memory, wherein
the image extension conversion unit predicts the density pattern generated in the resolution before the quantizing for the high resolution region among the quantized image, having the attribute data of other than the photographic image, to obtain decoded data corresponding to the plurality of pixels determined for the predicted density pattern.

13. An image processing method comprising a compression method to quantize an image having attribute data for each pixel, the compression method including:
quantizing a region of the image having the attribute data of a photographic image by a BTC method, and saving a quantized image in a memory, the quantizing and the saving being performed by an image compression conversion unit;
when a region of the image having the attribute data of other than the photographic image is a halftone region, quantizing the region by the BTC method, and saving the region in the memory, the quantizing and the saving being performed by an image compression conversion unit;
when the region having the attribute data of other than the photographic image is a high resolution region, generating a density pattern for the region by the image compression conversion unit; and
quantizing the region according to the density pattern and saving the quantized image in the memory, the quantizing and the saving being performed by the image compression conversion unit.

14. The image processing method of claim 13 further comprising an extension method to decode the image saved in the memory, the extension method comprising:
decoding the region having the attribute data of the photographic image by the BTC method, the decoding being performed by the image extension conversion unit;
when the region having the attribute data of other than the photographic image is the halftone region, decoding the region by the BTC method, the decoding being performed by the image extension conversion unit; and
when the region having the attribute data of other than the photographic image is the high resolution region, predicting the density pattern of the region, by the image compression extension unit; and
decoding the region according to a predicted density pattern by the image extension conversion unit.

\* \* \* \* \*